United States Patent
Seshadri

(10) Patent No.: US 6,658,421 B1
(45) Date of Patent: Dec. 2, 2003

(54) SYSTEM AND METHOD FOR DETECTING RELEASE-TO-RELEASE BINARY COMPATIBILITY IN COMPILED OBJECT CODE

(75) Inventor: Venkatadri Seshadri, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/503,462

(22) Filed: Feb. 14, 2000

(30) Foreign Application Priority Data

Feb. 22, 1999 (CA) .............................................. 2262316

(51) Int. Cl.[7] .............................................. G06F 17/30
(52) U.S. Cl. ...................... 707/100; 714/38; 717/126; 717/140
(58) Field of Search .................... 707/100; 717/116, 717/140, 126; 714/38

(56) References Cited

U.S. PATENT DOCUMENTS

| | | | | |
|---|---|---|---|---|
| 4,028,674 A | * | 6/1977 | Chuang | 382/123 |
| 5,500,881 A | * | 3/1996 | Levin et al. | 717/141 |
| 5,794,254 A | * | 8/1998 | McClain | 707/204 |
| 5,842,220 A | * | 11/1998 | De Groot et al. | 707/103 |
| 5,974,529 A | * | 10/1999 | Zumkehr et al. | 712/41 |
| 6,021,491 A | * | 2/2000 | Renaud | 713/179 |
| 6,058,396 A | * | 5/2000 | Birze et al. | 707/103 R |
| 6,064,751 A | * | 5/2000 | Smithies et al. | 382/115 |
| 6,202,201 B1 | * | 3/2001 | Domi | 717/5 |
| 6,285,760 B1 | * | 9/2001 | Crandall | 380/30 |
| 6,327,656 B2 | * | 12/2001 | Zabetian | 713/176 |
| 6,356,946 B1 | * | 3/2002 | Clegg et al. | 709/231 |
| 6,381,344 B1 | * | 4/2002 | Smithies et al. | 382/115 |

* cited by examiner

*Primary Examiner*—John Breene
*Assistant Examiner*—Cheryl Lewis
(74) *Attorney, Agent, or Firm*—Scully, Scott, Murphy & Presser; Richard M. Ludwin, Esq.

(57) ABSTRACT

Digital signatures of various aspects or characterizing indicia of object code classes are used to determine whether a compiled class has built-in assumptions about external classes that are incorrect due to modification and recompilation of the external class. The indicia generally involve an encoding of the layout of various run time structures in the external class such as field tables or method tables.

24 Claims, 17 Drawing Sheets

CLASS COMPILATION

80
RELOCATIONS TABLE

| 230 CLASS RELOCATION |
| --- |
| 231 DEREFERENCE - OFF-CLASS RELOCATION |
| 232 STATIC FIELD/METHOD RELOCATION |
| 233 BINARY COMPATIBILITY RELOCATION |

240
COMPILED - IN ASSUMPTIONS

---

241
STATIC METHOD INDEX IN METHOD BLOCK TABLE

242
STATIC FIELD INDEX IN FIELD BLOCK TABLE

243
INSTANCE METHOD OFFSET IN INSTANCE METHOD TABLE

244
INSTANCE FIELD OFFSET IN AN INSTANCE OF ITS CLASS

SYSTEM AND METHOD FOR DETECTING RELEASE-TO-RELEASE BINARY COMPATIBILITY IN COMPILED OBJECT CODE

BACKGROUND OF THE INVENTION

1. Technical Field

This invention relates to the implementation of object oriented languages that are statically compiled into platform-specific object code. More specifically, it involves detecting when changes to a class require clients of that class to be recompiled due to compiled-in assumptions about the changed class that the compiler has generated in the object code for the client classes.

2. Prior Art

Object oriented languages include the C++ and Sun Microsystems, Inc.'s Java programming languages. Java has been generally available on most widely used general computing systems since about 1996. It was originally intended for use as an interpreted language which could be used to program World Wide Web browsers. Lately, it has been gaining acceptance as a programming language for server applications. In this domain, performance of the application is critical. This motivates the need for optimizing static compilers that take Java source or bytecodes and generate highly optimized, platform-specific object code. The IBM® Visual Age® for Java High Performance Compiler (HPC) is such a compiler.

Typically, with respect to time, compile time is followed by execution time (which is also referred to as run time). Execution, or run, time includes load, initialize, execute and terminate times or processes. A programmer typically codes in source code, to produce a plurality of .c or .java files. During compile time, a compiler compiles these into object code files which are then linked into executable files in an application or library. Typically, many object files are linked into a much smaller number of executable files, referred to as a dynamically loaded library (DLL).

The problem addressed by the invention occurs when a programmer goes through the typical processes of editing, compiling, debugging, changing, and recompiling. Because of the large number of source files involved, it is desired to recompile only those source files which are changed, to regenerate only the object file corresponding to that changed source file. However, it is also the case that during compilation of one source file, the compiler makes assumptions about other source files to which the one source file refers. If, by virtue of the recompilation of the new source file, the assumptions in old source files are no longer valid, a release-to-release-binary incompatibility results.

Release-to-release binary compatibility (RRBC) in object oriented languages refers to the ability to modify a class without having to recompile all of the other classes in the application that refer to this class.

Compilers for statically compiled object oriented languages such as C++ embed assumptions about the layout of compiler-generated data structures for the referent classes in the compiled code of each class. These assumptions usually refer to the layout of fields in instances of the referent classes and the method tables of the referent classes. In general, the assumptions involve the particular indices of fields and methods within these structures. Since the assumptions are all made by the compiler, the user usually has no idea which classes need recompilation when a particular class has been modified, or in the case of object libraries, what those classes may even be.

Release-to-release binary compatibility has been implemented for statically compiled object oriented languages by developing object run time systems such as System Object Model (SOM). These run time systems specify the object models for which the compiler must generate code. RRBC is usually provided by adding an extra level of indirection into method dispatch and field access code generation. Typically, a compiler-generated static temporary is created (that is, has storage allocated) to hold the appropriate offset or table index, which is initialized by the object run time system to the appropriate value. Since method dispatch and field access tend to be frequent operations in object oriented programs, such an implementation imposes a considerable performance penalty on the application.

U.S. Pat. No. 5,339,438 (Conner et al.) for Version Independence for Object Oriented Programs describes a method for implementing RRBC in IBM's System Object Model (SOM). SOM involves using static temporaries initialized at application load time to hold the offsets or sizes that may change from version to version of a referent class. By adding an extra level of indirection to instance field references and instance method invocation, SOM implements RRBC. Introducing an extra level of indirection to implement full RRBC comes at a significant performance cost, and there is a need in the art for a high performance method for detecting RRBC violations without user intervention.

Another contemporary approach provides a technique for detecting whether a particular release of an operating system can correctly execute a program that is built with a higher (later) release of the same operating system (this is called downward compatibility). Each program contains a compatibility level indicator. The value of the indicator is determined by the compiler that generates the object code of the program by determining which instructions are used by the program. Any instruction is supported in a particular release and all subsequent releases of the operating system. The highest such release number among all instructions used by the program is the compatibility level indicator for the program. When the operating system loads the program for execution, it will only execute the program if the compatibility level indicator is less than or equal to its own release level. This method assumes a linear progression of compatibility. That is, a compatibility level of N implies that the program can be executed on all operating system release levels greater than or equal to N, and on no operating system level less than N. There is a need in the art for a solution to the problem of changing field and method tables in which this property (linear progression of compatibility) does not necessarily hold. Furthermore, there is a need for a method which allows for the separation of aspects of compatibility (i.e., if the field tables of a class change but the method tables do not, then only those client classes which require access to the field tables of the class will fail a run time signature check-that is, a check at run time initialization of a signature generated at compile time).

U.S. Pat. No. 5,768,588 (Endicott, et al.) for Efficient Method Router That Supports Multiple Simultaneous Object Versions describes the implementation of the New Object Model (NOM), which is the underlying object data structures and run time support that can be used to implement object oriented languages such as Smalltalk and C++, in particular, in an interactive environment. Objects in NOM contain a pointer to an interface table. The interface table contains a number of tuples, one for each class in the inheritance hierarchy for the class of the object. Each tuple contains a class signature to identify the class at that level in the hierarchy, and a pointer to a method table for methods of that class. A method invocation contains an object identifier, a level number, a call signature and a method table offset. The object identifier is dereferenced to obtain the interface table for the object, and the level is used as the index into this table. The call signature is checked against the class signature in the tuple found at this entry in the interface table. If they do not match, the program is aborted. If they do match, the method pointer is obtained by indexing the method table pointed to by this tuple with the method table offset in the call. Since NOM implements full RRBC (like SOM), the call signature is not used to detect RRBC violations. Instead it is used to check that the class hierarchy of the callee did not change from the time that the call was compiled (i.e., the class that is assumed to be at a particular level in the inheritance tree of the callee is in fact there at execution time). The NOM solution to implementation of full RRBC comes at a high cost in space and time. This NOM solution requires this check to be done dynamically at each method call, thus slowing down every method invocation. Extending this to RRBC checking would imply that it is done at each method invocation and field access, both of which are very common operations in object oriented programs. The NOM solution also requires a signature to be generated for each call site in the program, which when executed to RRBC checking would require a signature for each call site and field access. There is a need for a solution that has neither of these shortcomings. That is, there is a need in the art for a binary compatibility checking method that is done once per referenced class-assumption pair, at class loading time, thus incurring a fixed overhead which can be amortized over the entire execution time of the application. Also, for a method where common checks are performed only once for the class, not once per call site or field access.

Thus, it is desirable and advantageous to have an improved system and method for release-to-release binary compatibility (RRBC) checking which can enable improved execution time performance. If is also desirable and advantageous to have RRBC checking that has only initialization-time (i.e., load time) cost, and does not slow down field access or method invocation. Further, it is desirable and advantageous to have a system for RRBC checking that can provide better space utilization, optionally achieved through factoring into one check assumptions about an aspect of a particular class (i.e., same repeated checks are not performed). It is also desirable and advantageous to have a system and method for RRBC checking which does not assume a linear progression of compatibility between versions and does not require source code to determine compatibility. Moreover, it is desirable and advantageous to have a system and method for RRBC checking in which all signatures are embedded into compiler-generated binary structures and does not require the user to provide version information—it is done without user input. It is also desirable and advantageous to provide a way during run time to check all object files that have been bound (i.e., linked) together to determine if the assumptions made in each object file are still valid and for establishing dependencies at the assumption level, as distinguished from the class level.

SUMMARY OF THE INVENTION

The invention provides a system and method for detecting binary compatibility in compiled object code. In accordance with the system of the invention, a referring class metadata store includes a class structure table for storing during compilation of the referring class at least one signature indicia assumed by the referring class with respect to table contents in a referent class. In accordance with the method of the invention, during compilation of the referring class, characterizing indicia for a referent class is encoded into class metadata for the referring class. During initialization at run time, the characterizing indicia in the metadata of the referring class is checked for correspondence with referent class metadata.

There is provided a method for detecting binary compatibility in compiled object code, comprising the steps of generating a signature for each of one or more structures, comparing the signatures for corresponding structures at compile time and responsive to said signatures not comparing equal, signaling incompatibility. There is also provided a method for detecting binary incompatibility in object code, comprising the steps of, during compilation of a referring class, encoding characterizing indicia for a referent class into class metadata for said referring class, during run time processing, checking said characterizing indicia for correspondence, and responsive to lack of correspondence, emitting an error message. The above method may also further comprise the step of encoding as said characterizing indicia at least one signature selected from the set comprising a field block table signature, an instance method table signature, an instance data signature, and a method block signature. The method may also comprise the step of calculating said field block table signature as a function of the indexes of one or more static field entries in a field block table, the step of calculating said method block table signature as the index of a static method in the method block table of said referent class, the step of calculating said instance data signature as the offset of an instance field in an instance of said referent class, or the step of calculating said instance method table signature as the offset of an instance method in the instance method table of said referent table.

The above methods may also further comprise the steps of processing a relocation by checking an assumed signature in the relocation table of said referring class with an actual signature in the referent class, responsive to said signatures matching, continuing execution, and responsive to said signatures not matching, emitting an error message and aborting the application. Said characterizing indicia may also include at least one assumption made about the order that named entities appear in a table in said referent class. And, the step of generating said characterizing indicia as a function of a character stream may include ordered references by name to bytecode entities providing a unique representation of said table. Further, said character stream may be encoded using a digital signature. And, the above methods may further comprise the step of encoding said characterizing indicia when compiling getstatic and putstatic bytecodes for said referent class in a different dynamic loaded library from said referring class.

Also, there may be provided an above method further step of encoding said method block table signature when compiling an invokestatic bytecode in the case where said referent class is in a different dynamic loaded library from said referring class, and encoding said method block table signature when compiling an invokeinterface bytecode. Also, an above method may further comprise the step of encoding said instance data signature when compiling getfield and putfield bytecodes for said referent class, encoding said instance data signature when generating an instance field layout for said referring class, and encoding said instance data signature for an implicit referent class which is a superclass of said referring class. And, an above method may further comprise the step of encoding said instance method table signature when compiling the invokevirtual and invokespecial bytecodes, and encoding said instance method table signature when generating the instance method table of said referring class and implicit referent class is a superclass of said referring class A.

There is also provided a program storage device readable by a machine, tangibly embodying a program of instructions executable by a machine to perform any of the above method steps for detecting binary compatibility in compiled object code.

There is also provided a computer system for detecting binary compatibility in compiled object code, comprising a referring class metadata store; a referent class metadata store; said referring class metadata store including a class structure table for storing during compilation of a referring class at least one signature indicia assumed by said referring class with respect to table contents in a referent class; and a comparator for comparing said signature indicia with a class structure table signature in said referent class metadata store. The above computer system may also be provided wherein said signature indicia being selected from the set comprising a field block table signature, an instance method table signature, an instance data signature, and a method block signature.

There is also provided an article of manufacture comprising a computer useable medium having computer readable program code means embodied therein for detecting binary compatibility in compiled object code, the computer readable program means in said article of manufacture comprising computer readable program code means for causing a computer to effect generating a signature for each of one or more structures, computer readable program code means for causing a computer to effect comparing the signatures for corresponding structures at compile time, and computer readable program code means for causing a computer to effect, responsive to said signatures not comparing equal, signaling incompatibility.

Also, there is provided an article of manufacture comprising a computer useable medium having computer readable program code means embodied therein for detecting binary compatibility in compiled object code, the computer readable means in said article of manufacture comprising computer readable program code means for causing a computer during compilation of a referring class, to encode characterizing indicia for a referent class into class metadata for said referring class, computer readable program code means for causing a computer during run time processing, to check said characterizing indicia for correspondence, and computer readable program code means for causing a computer responsive to lack of correspondence, to emit an error message. The above article of manufacture may further comprise computer readable program code means for causing a computer to encode as said characterizing indicia at least one signature selected from the set comprising a field block table signature, an instance method table signature, an instance data signature, and a method block signature. And, the above articles of manufacture may further comprise computer readable program code means for causing a computer to process a relocation by checking an assumed signature in the relocation table of said referring class with an actual signature in the referent class, responsive to said signatures matching, to continue execution, and responsive to said signatures not matching, to emit an error message and aborting the application.

There is also provided a method for detecting binary compatibility in compiled object code classes, comprising the steps of generating signatures corresponding to one or more first assumptions of a plurality of possible assumptions for each of one or more corresponding classes, comparing said signatures corresponding to said first assumptions for said corresponding classes at compile time, responsive to said signatures corresponding to said first assumptions comparing equal, determining class compatibility irrespective of changes in assumptions other than said first assumptions, whereby binary compatibility of object code classes is determined at the assumption as distinguished from the class level.

Also provided is an article of manufacture comprising a computer useable medium having computer readable program code means embodied therein for detecting binary compatibility in compiled object code, the computer readable program means in said article of manufacture comprising computer readable program code means for causing a computer to generate signatures corresponding to one or more first assumptions of a plurality of possible assumptions for each of one or more corresponding classes, computer readable program code means for causing a computer to compare said signatures corresponding to said first assumptions for said corresponding classes at compile time, computer readable program code means for causing a computer to determine class compatibility irrespective of changes in assumptions other than said first assumptions responsive to said signatures corresponding to said first assumptions comparing equal, whereby binary compatibility of object code classes is determined at the assumption as distinguished from the class level.

Further, there is provided a computer system for detecting binary compatibility in compiled object code, comprising means for generating a signature for each of one or more structures, means for comparing the signatures for corresponding structures at compile time, and means for signaling incompatibility responsive to said signatures not comparing equal.

And, there is provided a computer system for detecting binary compatibility in object code, comprising means for encoding characterizing indicia for a referent class into class metadata for a referring class during compilation of said referring class, means for checking said characterizing indicia for correspondence during run time processing, and means for emitting an error message responsive to lack or correspondence.

Other features and advantages of this invention will become apparent from the following detailed description of the presently preferred embodiment of the invention, taken in conjunction with the accompanying drawings.

BRIEF DESCRIPTION OF THE DRAWINGS

Preferred embodiments of the present invention will now be described, by way of example only, with reference to the accompanying drawings in which:

FIG. 17 is a diagrammatic representation of compiled-in assumptions.

DETAILED DESCRIPTION OF THE PREFERRED EMBODIMENTS OF THE INVENTION

The following description of the preferred embodiment of the invention includes the following parts:
1. Object Oriented Programming in Java: an overview of how Java applications are traditionally built and executed, including an overview of the Java language features that are relevant to this invention.
2. Static Compilation of Java using HPC: an overview of how users build Java applications using HPC, including a description of some internal run time data structures that are relevant to this invention.
3. Execution of Java Applications Built Using HPC: an overview of how users execute Java applications built using HPC, including a description of how the HPC run time system loads, initializes and executes an application.
4. Release-to-Release Binary Compatibility in Java Virtual Machines: an overview of how RRBC works in a Java virtual machine and how this presents a problem to HPC.
5. How the RRBC Problem is Handled in HPC: a detailed description of the preferred embodiment of the invention for handling the RRBC problem.

Part 1. Object Oriented Programming in Java

Java is an object oriented programming language, and is described in detail in the Java Language Specification. See "The Java Language Specification", by James Gosling, Bill Joy and Guy Steele (published by Addison-Wesley, 1996. ISBN 0-201-6341-1). It is similar to other oriented languages, but there are some features which are of especially germane to this invention.

The Java Programming Language

Figure 1:
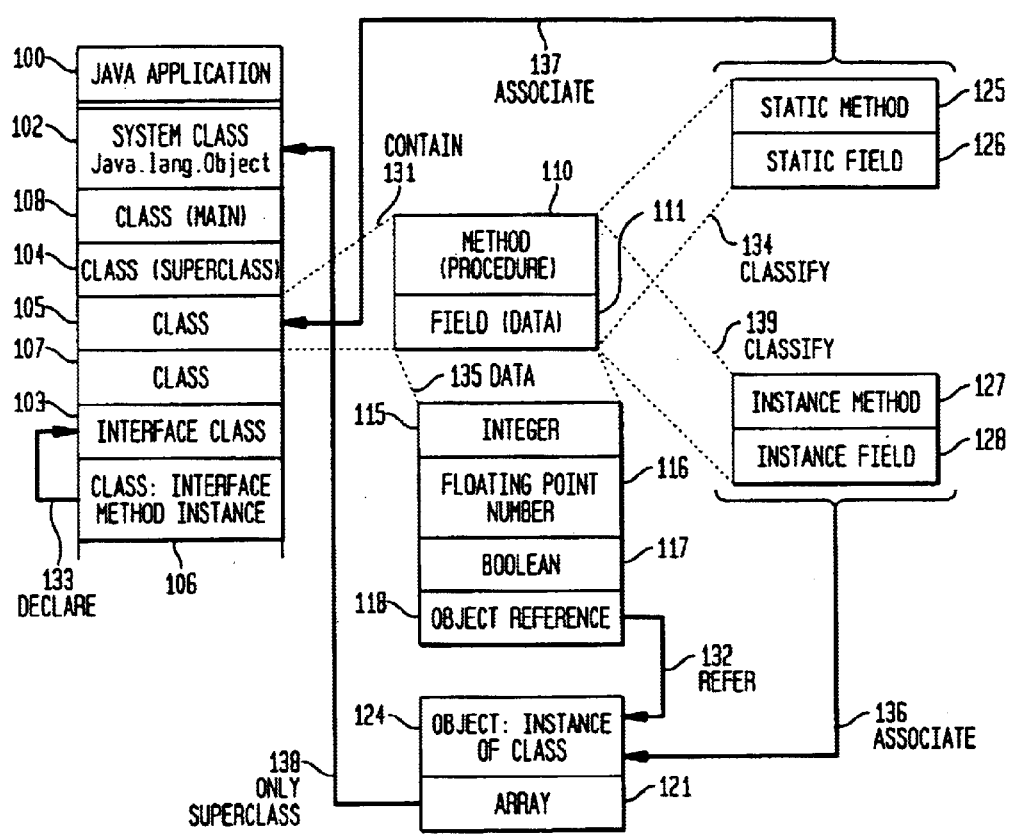
FIG. 1 is a diagrammatic representation of the class structure in Java.

Referring to FIG. 1, the basic programming unit is a class, and a Java application 100 simply a collection of classes 102–108. Unlike C++, nothing in Java exists outside of a class.

Figure 2:
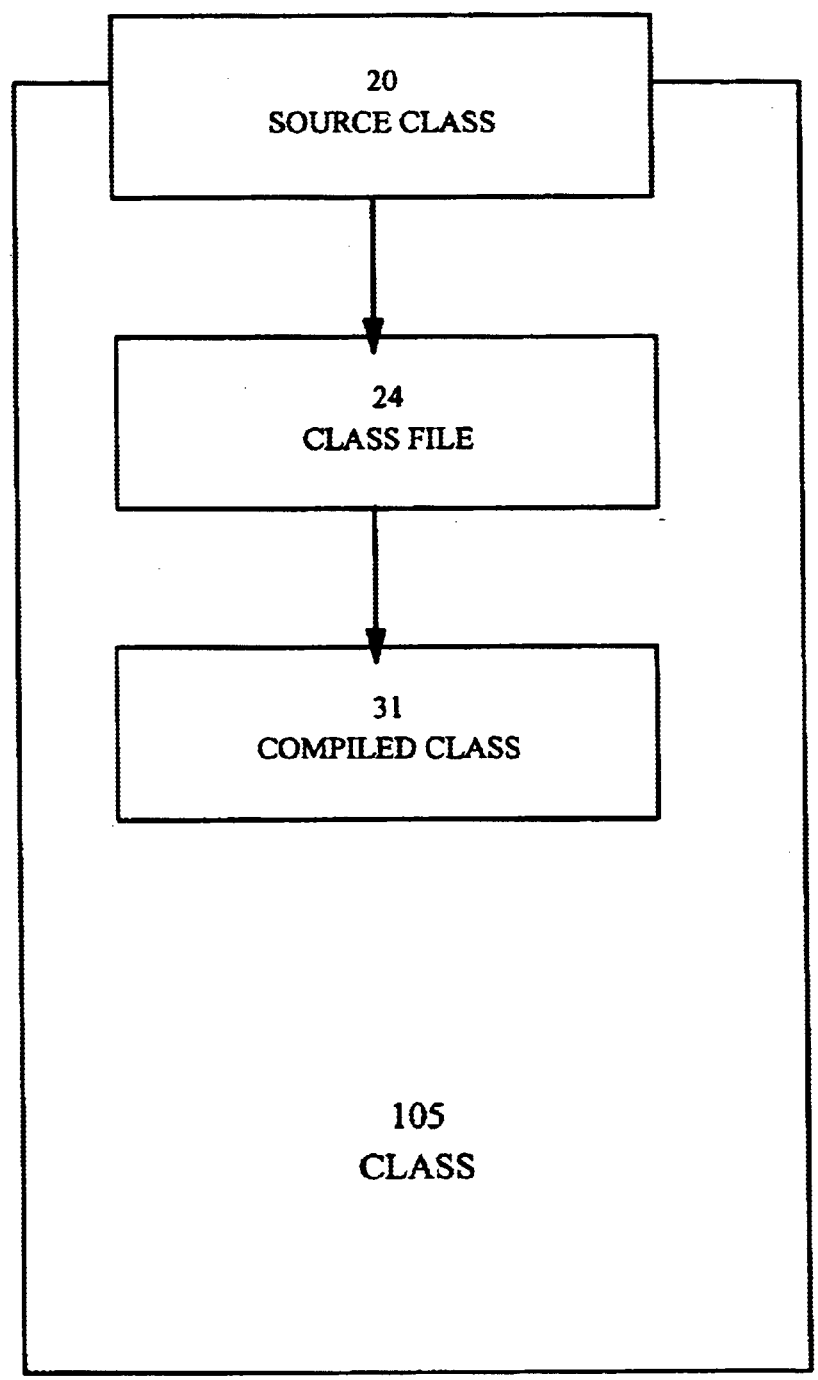
FIG. 2 is a diagram illustrating various forms, or embodiments, of a Java class.

Referring to FIG. 2, classes, for example class 105, has several embodiments. It may exist as a source class 20, as a class file 24, and as a compiled class 31. Each of these embodiments will be further described hereafter. For purposes of the following description, references to classes may, unless otherwise apparent by its context, be interpreted as referring to the class in any of these embodiments.

In each of these embodiments, classes contain, as is represented by line 131, methods (procedures) 110 and fields (data) 111. As represented by line 135, the basic data types are one, two, four and eight byte signed integers 115, four and eight byte floating point numbers 116, booleans 117, and object references 118 which refer to objects 124, as represented by line 132. Arrays 121 are considered to be objects 124. A class 103–108 can have exactly one immediate superclass; the special system class java.lang.Object 102, which is at the root of the inheritance tree, has no superclass. As is represented by line 138, arrays 121 are considered to have java.lang.Object 102 as their only superclass. There are special types of classes called interface classes 103. These classes contain method 110 declarations without code to implement those methods. Other (non-interface) classes 106 can declare (as is represented by line 133) that they implement one or more specific interface classes 103, and if so, they must provide implementations of all the methods 110 defined in all of the interface classes 103 that they claim to implement. A method 110 in a class 106 which implements a method declaration in an interface class 103 is called an interface method.

Methods 110 and fields 111 are classified, as is represented by line 134, as static methods 125 or static fields 126, respectively, or as represented by line 139 as instance methods 127 or instance fields 128, respectively. The presence of the keyword static in the source code which defines the method 110 or the field 111 indicates that the method or field is static (125 or 126); otherwise it is an instance method or field 127 or 128, respectively. Instance methods and fields 127, 128 are associated (as is represented by line 136) with objects (i.e., instances of the class) 124. Static methods and fields 125, 126 are associated, as is represented by line 137, with the class 105 itself. Interface methods (methods 110 of interface classes 103) are all instance methods 127.

Figure 3:
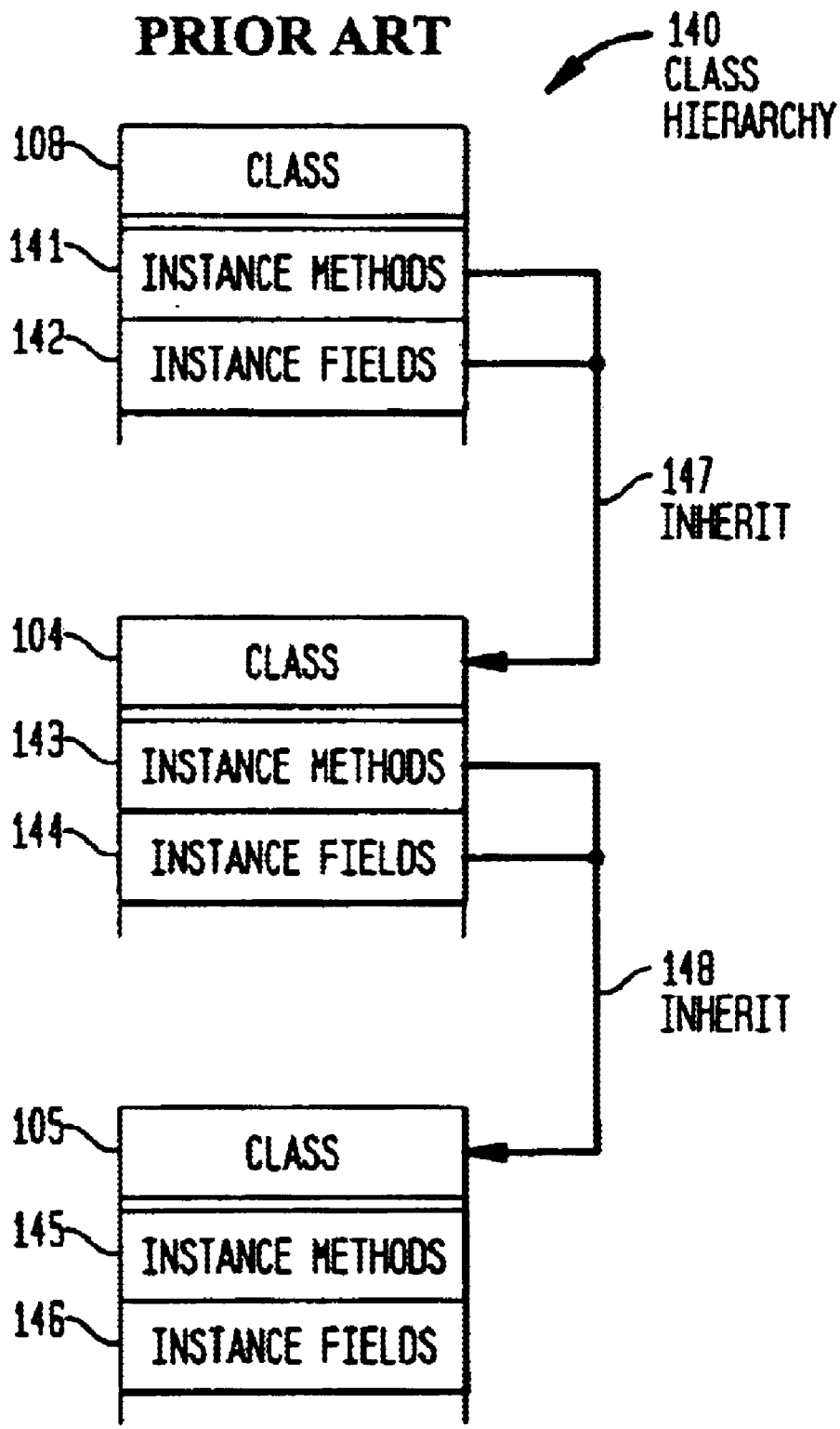
FIG. 3 is a diagrammatic representation of class hierarchy and inheritance.

Referring to FIG. 3, class hierarchy 140 includes classes 108, 104, 105. Each class 104, 105 inherits all of the instance fields and instance methods of its superclass 108, 104, respectively, as represented by lines 147, 148. With respect to class 105, class 105 implicitly contains all of the instance methods 141, 143 and instance fields 142, 144 that are either explicitly declared in its superclass 104, or that its superclass 104 inherits from its superclass 108, and so on. In the case of an inherited method or field X (143, 144) of a class A (105), the implementation or definition of that method or field is contained in the superclass 104 of A (105) where X (143,144) was defined. An instance method or instance field X 145, 146 is said to be overriden by a class 105 if both it (class 105) and one of its superclasses (108 or 104) contain an implementation of X. In this case, the implementation of X (say, instance field 146) for class A (say, class 105) is the one (instance filed 146) in class A 105.

Referring further to FIGS. 1 and 3, there is only one copy of a static field 126 (one for the class 105 in which it is defined), while there are multiple copies of an instance field 128 (one per object 124 that contains that instance field). Since an instance field 128 is associated with an object 124, memory for it is allocated when the object 124 is created, while memory for a static field 126 is allocated once, when the class 105 is loaded into memory.

Static methods 125 are invoked in the context of a class 105 (i.e., one specifies a class 105 and the static method 125 of the class that is to be invoked), and the target method 110 (which will be in one of classes 102–108) can always be determined statically. Instance methods 127, however, are invoked relative to an object 124 reference and due to subclassing, the target method 110 may not be known statically. For example, an invocation of instance method X 127 on an object reference 118 of type A is a call to the particular method X 110 implemented by the particular object 124 being referenced, which may be of type A class 107, or any other class which is a subclass of A. And since the particular class 102–108 of the object reference 118 is not known (only that it is either of class A, or a subclass of A which may reimplement the method X), the particular method 110 called cannot always be known definitively until run time.

Referring to Table 1, sample source code illustrates the class structure of Java.

TABLE 1

JAVA CLASSES

```
interface I1{
    void x();
    int y();
}
class C1 implements I1{
    int tt;
    C1(int i) {
        tt=i;
    }
    void x() {
        tt=tt+1;
        return;
    }
    int y () {
        return tt;
    }
    void z () {
        tt=tt-1;
        return;
    }
}
class C2 extends C1{
    static int p=0;
    C2 (int i) {
        super(i);
    }
    int y(){
        return (tt/2);
    }
    static void print(C1 c) {
        p=p+1;
        java.Lang.System.out.println(c.y()};
        return;
    }
}
```

Figure 4:
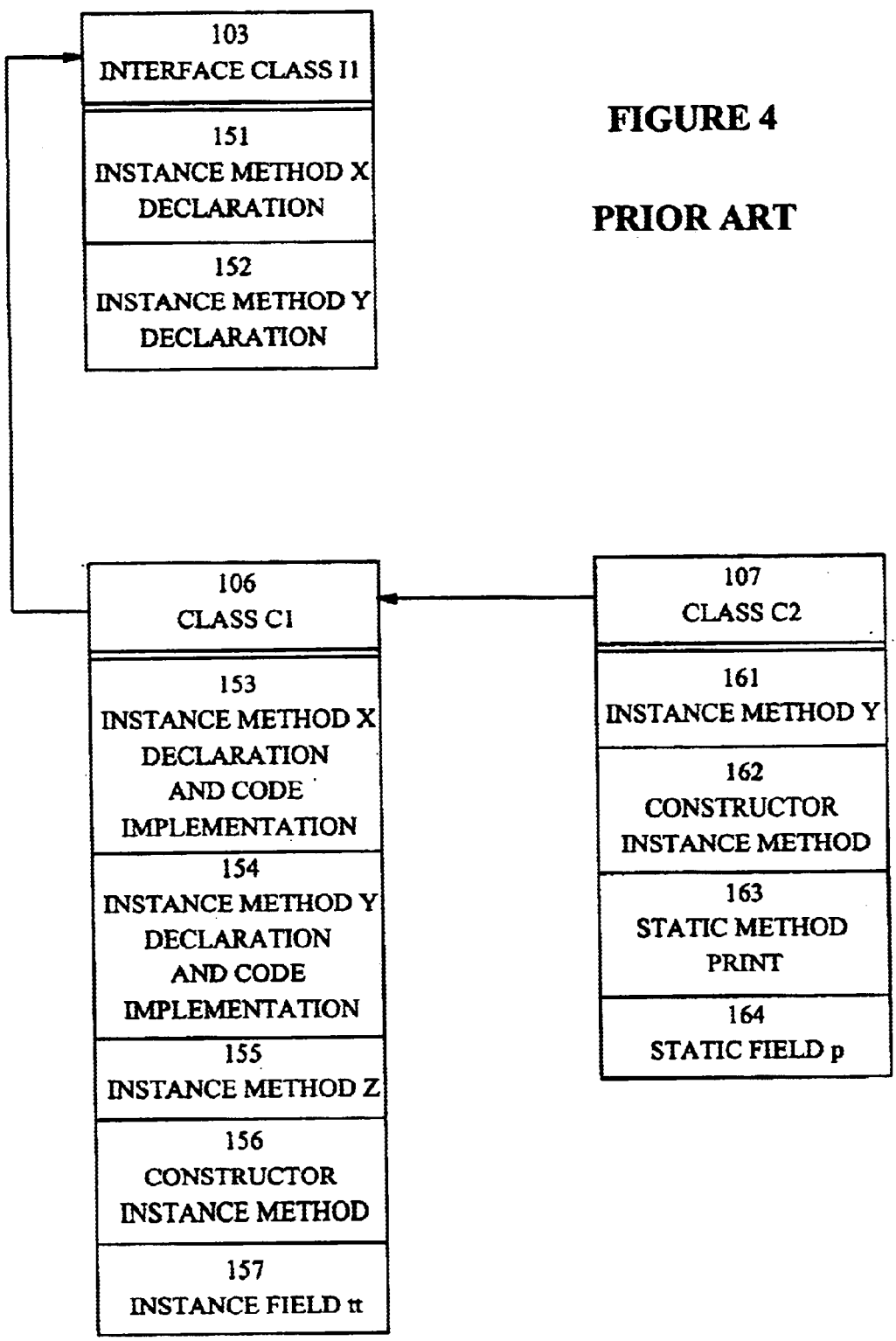
FIG. 4 is a diagrammatic representation of class structure illustrating an interface class and its interface method instance.

Referring to Table 1 in connection with FIGS. 1 and 4, interface I1 103 is declared to have two methods, instance method X 151 (returning nothing) and instance method Y 152 (returning an integer).

Class C1 106 is declared to implement interface I1 103, and so it must provide implementations 153, 154 for method X 151 and Y 152, respectively. It additionally has a constructor instance method 156 which takes an integer as an argument, and an instance method Z 155, which takes no arguments. Class C1 106 has no static methods and no static fields. Is has four instance methods 153–156 (including the constructor) and an instance field (tt) 157.

Finally class C2 107 is declared to extend C1, which means that its immediate superclass is C1 106. It overrides the instance method Y 154 and the constructor 156, providing its own implementations 161, 162 of these, but it inherits instance methods X 153 and Z 155, and the instance field tt 157. Additionally, it has a static method print 163, and a static field p 164, which is statically initialized to zero. A call to the static method print 163 in class C2 107 with an argument of type C1 106 will cause the method Y 154 in class C1 106 to be invoked. However a call to print 163 with an argument of type C2 107 (which is legal size C2 107 is a subclass of C1 106 and can therefore be cast to C1 106) will result in the method Y 161 in class C2 107 being invoked. In both cases, the value of the static field p 164 in class C2 107 will be incremented.

Java Class Files

Figure 5:
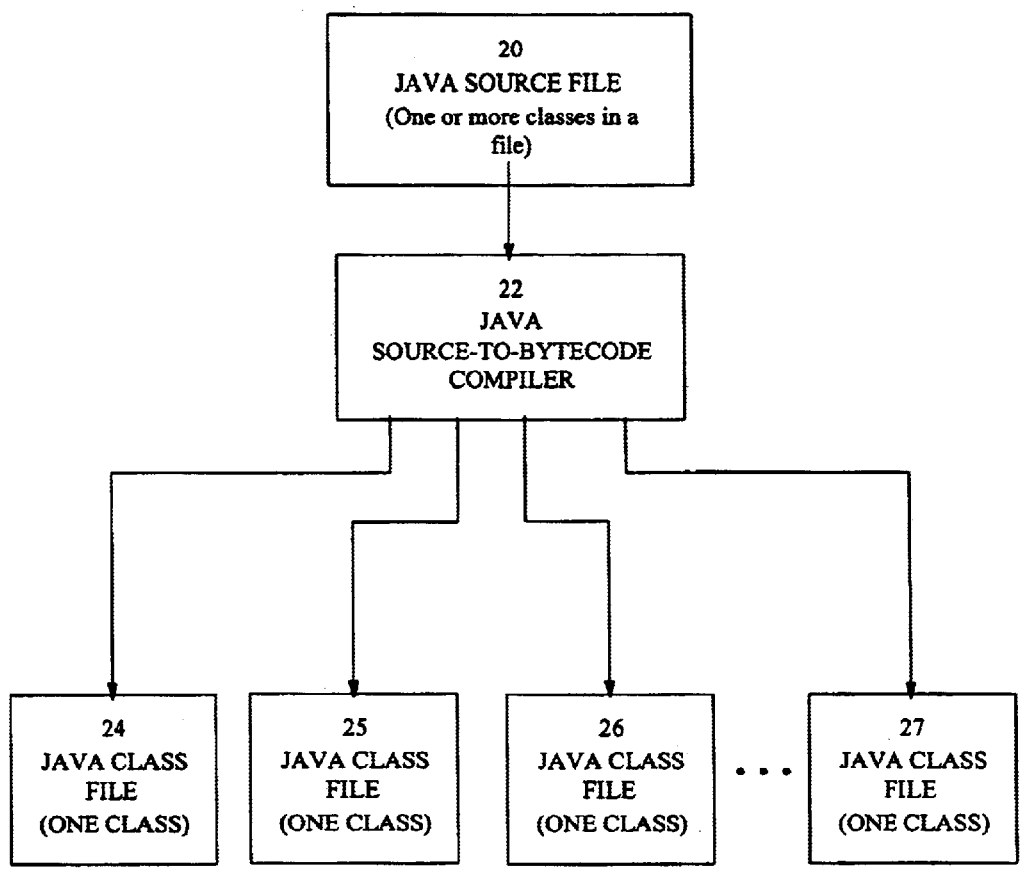
FIG. 5 is a flowchart of the process of compiling Java source code into class files.

Referring to FIG. 5, Java source programs 20 (such as Java application 100 classes 102–104) are compiled into Java class files 24–27. Java class files 24–27 are a low-level machine-independent representation of Java classes 102–108. Each Java class 102–108 is compiled by compiler 22 into one class file 24–27, which is then resident on the file system of the computer.

Figure 6:
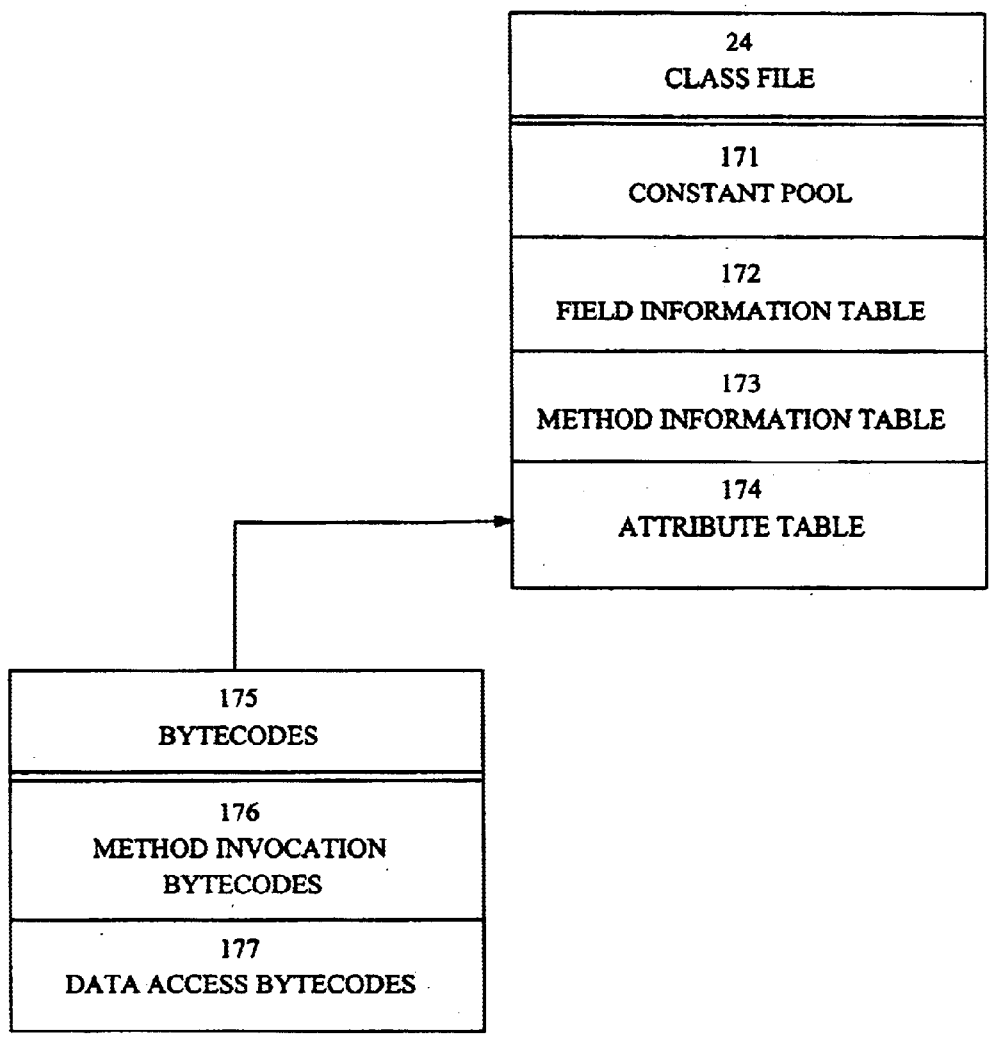
FIG. 6 is a diagrammatic representation of the structure of a class file.

Referring to FIG. 6, the information contained in a representative class file 24 relevant to this invention is:

1. The constant pool 171: The constant pool is an array of variable length structures representing various numeric and string constants 115–118 used in the class, names of fields 111 and methods 110 in this class 24 and other classes, and names of other classes.

2. The field information table 172: The field information table is an array of variable length structures containing information about the static fields 126 and instance fields 128 declared in this class 24 (i.e., non-inherited fields). There is one entry in this table 172 for each 111 declared in this class 24.

3. The method information table 173: The method information table is an array of variable length structures containing information about the static methods 125 and instance methods 127 declared in this class 24 (i.e., non-inherited methods). There is one entry in this table for each method 110 declared in this class 24.

4. The attribute table 174: The attribute table is an array of variable length structures containing supplementary information for the class 24 or entries in the variable tables 171–173 in the class file. Of particular note is the code attribute. There is one code attribute in attribute table 174 for each entry in the method information table 173, which contains the bytecodes that are the implementation of that method 110.

In summary, the fields 111 of class 24 are described in the field information table 172. The methods 110 of the class 24 are described in the method information table 173. Two supporting tables are used to contain constants and names (the constant pool 171) and other supplementary information, including the actual code that implements the methods declared in the class (attribute table 174).

The code that implements the methods is described using an instruction set called the Java bytecodes 175. This is a stack-oriented instruction set, with some high level characteristics. Of relevance to this invention are the following:

1. Method invocation bytecodes 176: There are four method invocation bytecodes
   invokevirtual,
   invokespecial,
   invokestatic and
   invokeinterface.

The invokevirtual and invokespecial bytecodes are used to invoke instance methods 127 (with slightly different interpretations that are not relevant to this invention). They take as parameters an object reference 118 and all of the parameters for the method 110. Embedded in the bytecode 176 is a reference to an entry in the constant pool 171 which describes the class 102–108 name and method name that should be used to find the target method 110. The object reference 118 on the stack is known to be either an instance 124 of this class 102–108 or one of its subclasses. The invokestatic bytecode works in the same way except that it does not take an object reference 118 as a parameter. The method 110 given in the appropriate constant pool 171 entry is the method 110 in the class 102–108 given in the constant pool 171 entry that should be called for this bytecode 176. Finally, the invokeinterface bytecode works in the same manner as the invokevirtual bytecode, except that the constant pool 171 entry contains the name of an interface class 106 and an interface method 110 that must be called. The object reference 118 on the stack for this bytecode 176 is known to be an instance 123 of a class 106 that implements the specific interface 103.

2. Data access bytecodes 177: The data access bytecodes include:
   getfield,
   putfield,
   getstatic,
   putstatic,
      the aload family of bytecodes (one per data type) and
      the astore family of bytecodes (one per data type).

The aload and astore families of bytecodes are used to load and store elements from and to arrays 121. They take an object reference 118 (known to be of array type), an index and, in the case of astore, the value to be stored as arguments and perform the appropriate operation. The getfield bytecode takes an object reference 118 as an argument. Embedded in the bytecode is a reference to a constant pool 171 entry that gives the name of the class 102–108 and the instance field 128 of the class whose value is to be loaded from the instance data 128 of the object reference 118. The object reference 118 is known to be either an instance of the class 102–108 named in the constant pool 171 entry, or an instance of a subclass of that class 102–108. The putfield bytecode operates similarly, except that it takes an additional argument, the value to be stored into the instance field 128 named in the constant pool 171 entry. The getstatic and putstatic bytecodes operate in a manner similar to the getfield and putfield bytecodes, except that they take no object reference 118 as a parameter, and the field named in the constant pool 171 entry referred to by the bytecode is a static field 126 of the class 102–108 named in the constant pool 171 entry.

The important property here is that the references that these bytecodes 175 make to fields 111, methods 110 and classes 102–108 are all by name. They do not use numeric offsets or hard coded addresses. Although these may be turned into numeric offsets or hardcoded addresses (as appropriate) at execution time, this is not manifested externally in the binary class file 24 (25–27).

Execution of a Java Application by a Java Virtual Machine

The Java class file 24–27 is a machine independent representation of a Java class 102–108. Since it is machine independent, it cannot run directly on any arbitrary CPU, whose instruction set and file format may be completely different from the Java bytecodes 175 and class file 24 format. Therefore, Java programs, or applications, 100 are executed by a program called a virtual machine 28. This program takes as arguments the initial class file 24 (which for the purposes of this discussion corresponds to, or is the representation of, class 108) to load and the arguments to pass to the method 110 in that class 24 called main () with a single array 121 of strings as its argument. Generally, it must load all of the class files 24–27 needed to execute the program 20/100 into memory and execute the bytecodes 175 starting with the method main () in the specified class 24.

Table 2 shows pseudo-code for loading classes 24–27 in a Java virtual machine 28.

TABLE 2

LOADING CLASSES IN A JAVA VIRTUAL MACHINE 28

```
load class (class) {
    if class is already loaded, return;
    locate and load the class file for class;
    verify class;
    prepare class;
    if aggressively loading classes then
        for each class1 referenced by class do
            load class (class1);
        end for;
    end if;
    load class (superclass of class);
    initialize class;
    return;
}
```

Referring to Table 2 in connection with FIG. 7, execution proceeds as follows. First, in steps 180 and 181, the class file for the specified main class (assume that this is class 24) is located on the computer's file system and loaded into memory.

Class loading step 181 comprises four steps—verification step 182, preparation step 184, resolution step 186 and initialization step 188, and this will be described with respect to class loading of, for example, class 26, as follows:

During verification step 182, the virtual machine 28 checks to see that the class file 26 is well formed and follows all of the semantics of Java.

Figure 7:
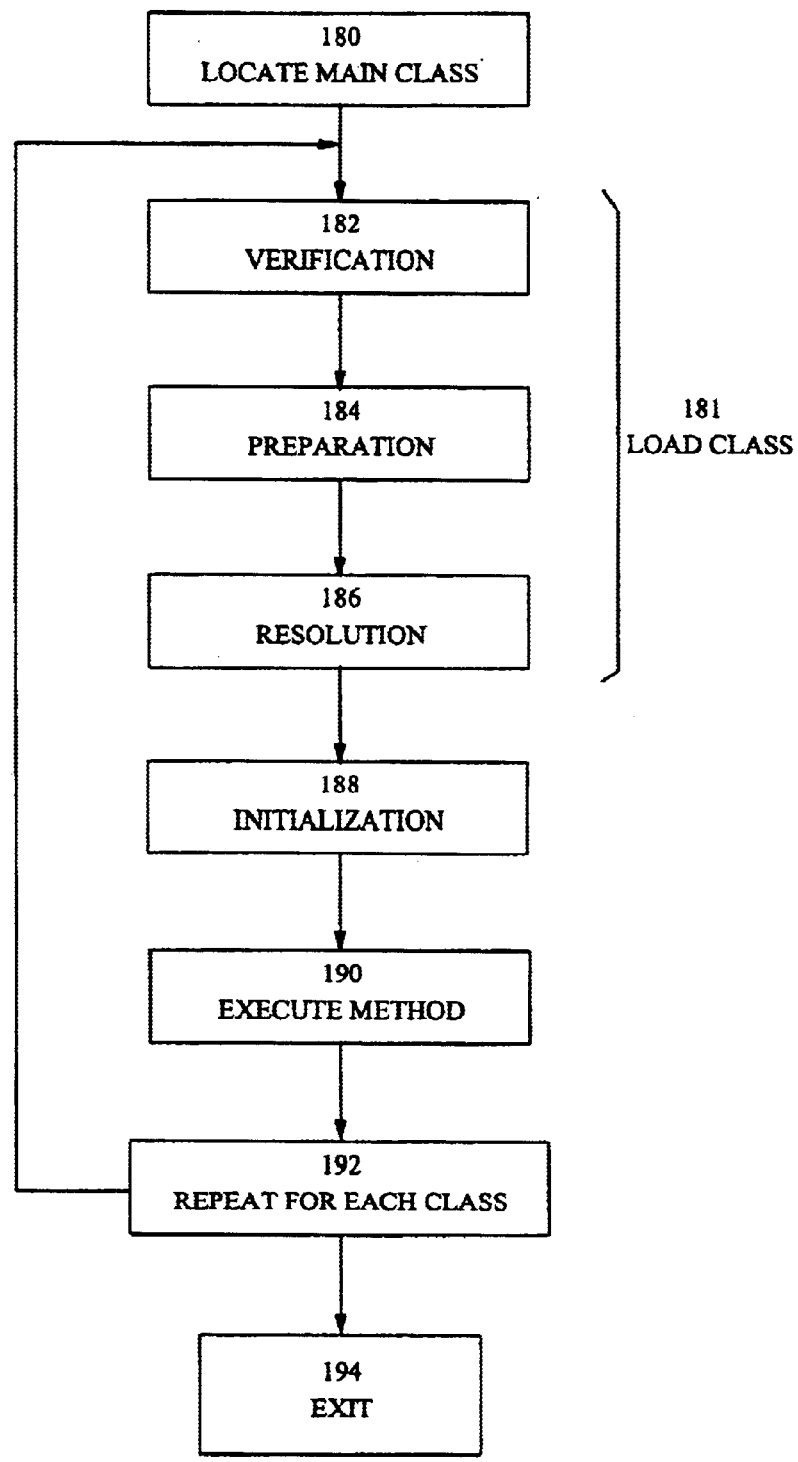
FIG. 7 is a flowchart illustrating a method for loading classes in a virtual machine.
Figure 8:
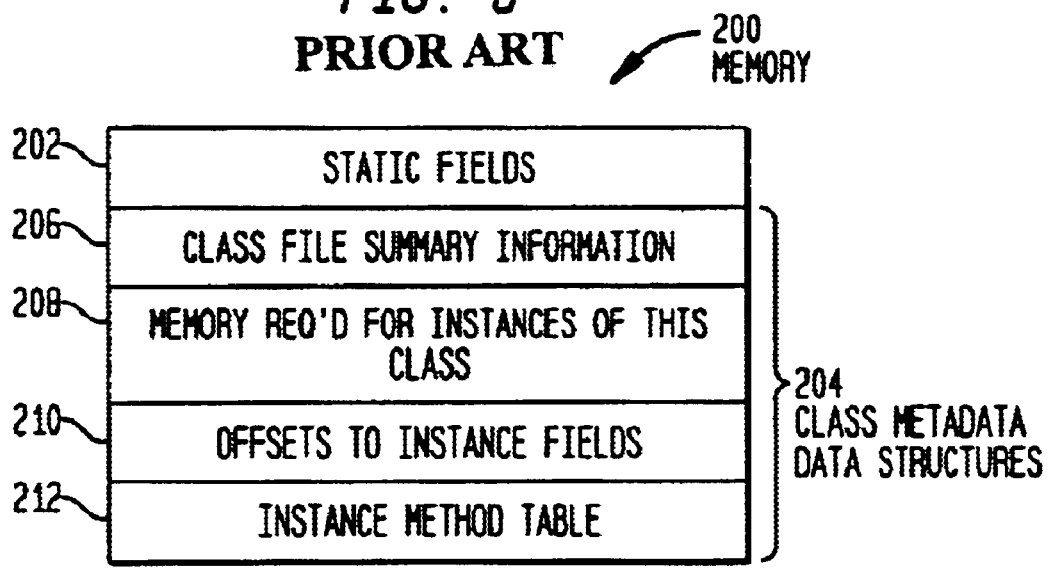
FIG. 8 is a diagrammatic representation of class metadata structures generated by a virtual machine.

Referring to FIG. 8 in connection with FIG. 7, during preparation step 184, memory 200 is allocated for all of the static fields 202 (see 126, FIG. 1) off the class 26 and all of the internal data structures 204 used by the virtual machine 28 for that class 26 are created.

These data structures are referred to as class metadata, and usually consist of information describing that class 26. In a typical Java virtual machine 28, such information includes:

1. Summary information 206 of the information in the class file 26 (e.g., method information table 173, field information table 172, constant pool 171, and attribute table 174).
2. Amount of memory 208 required to hold the instance data for instances 124 of this class.
3. For each instance field 128 for instances 124 of this class 26, the offset 210 form the top of the memory 200 allocated for objects (that is, instances) 124 of this class where the instance field 128 is located. This includes all of the inherited fields 128 for this class. (See the discussion, supra,. re FIG. 4.) Typically, the inherited fields are at the same offsets as they are in the superclass, say class 25, of this class 26, and instance fields 128 declared in this class 26 are allocated at the end. This mapping of instance fields 128 to offset 210 implies that all references to field names of this particular class 26 in getfield and putfield bytecodes can be replaced by the corresponding offsets 210 from class 25, which when used with the object reference argument to the bytecode will access the appropriate memory location.
4. The instance method table 212 for this class 26. This table consisting of all of the instance methods 127 that this class both inherits and defines. This table 212 is typically constructed in the following manner: copy the instance method table 212 of the superclass, for example, class 25, and add methods 110 declared in this class 26 according to whether they override superclass 25 methods 110 or not. If they override a superclass' method 110, then overwrite the overridden method (method 110 is class 25) with the overriding method (method 110 is class 26). If they (methods 110 in class 26) do not override an existing method, then add them to the end of the instance method table 212. This implementation has the useful property that a reference to an instance method 127 in a particular class in an invokevirtual or invokespecial bytecode can be replaced by the index into the instance method table 212 of that class, and without searching, the virtual machine 28 can simply dispatch the method found at that entry in the instance method table 212 associated with the object reference 118 used in that bytecode 175.

In a typical preparation process 184, enough internal information is generated by the virtual machine 28 that the use of explicit names in the bytecodes 175 mentioned earlier can be replaced by either machine addresses or hardwired offsets. This makes for much more time-efficient execution. Without the offsets or hardwired addresses, the virtual machine would have to search through the target class for information regarding the field 111 or method 110 in question, which since they are represented by name, would require string comparisons (or at least a simple hashing scheme) to locate.

During resolution step 186, referent classes (say, class 27) are loaded (steps 182–188) into the virtual machine 28. A class 26 can make references to other classes 27 through the bytecodes 175, as seen with the method invocation or data access bytecodes (among others). Resolution 186 is the process of loading these classes 27 into the virtual machine 28. This can happen aggressively, during loading of the current class 26, or lazily, when the bytecodes 175 referencing those classes 27 are executed. The choice of whether to resolve classes 27 lazily or aggressively is left to the implementor of the particular virtual machine 28.

Finally, during initialization step 188, user data is initialized to the initial values specified by the user in the program. Class initialization requires that the class' superclass 25 be initialized before the class 26 can be initialized. This implies that all superclass 25 of a class 26 must be loaded before that class 26 can be loaded.

Once this process 181 is complete, the class 26 is loaded and in step 190 the appropriate method can be executed. Execution consists of the virtual machine 28 executing the bytecodes 175 for method 26 until in step 194 the program exits.

Class loading 181 can therefore be seen to occur in the following situations: loading 180 of the initial class 24 at program startup, loading of superclass 25 due to class 26 initialization 188, and loading of referent classes 27 during resolution 186 (either lazily or aggressively). A fourth situation in which class loading 181 can occur is when a user calls the Java APIs java.lang.Class.forName( ) or java.lang.ClassLoader.defineClass( ). These APIs allow the user to give the Java virtual machine 28 the name of a class and have the virtual machine load that class through the process specified above. This may result in other classes being loaded (for example, loading of superclasses during class initialization).

Part 2: Static Compilation of Java using HPC

Figure 9:
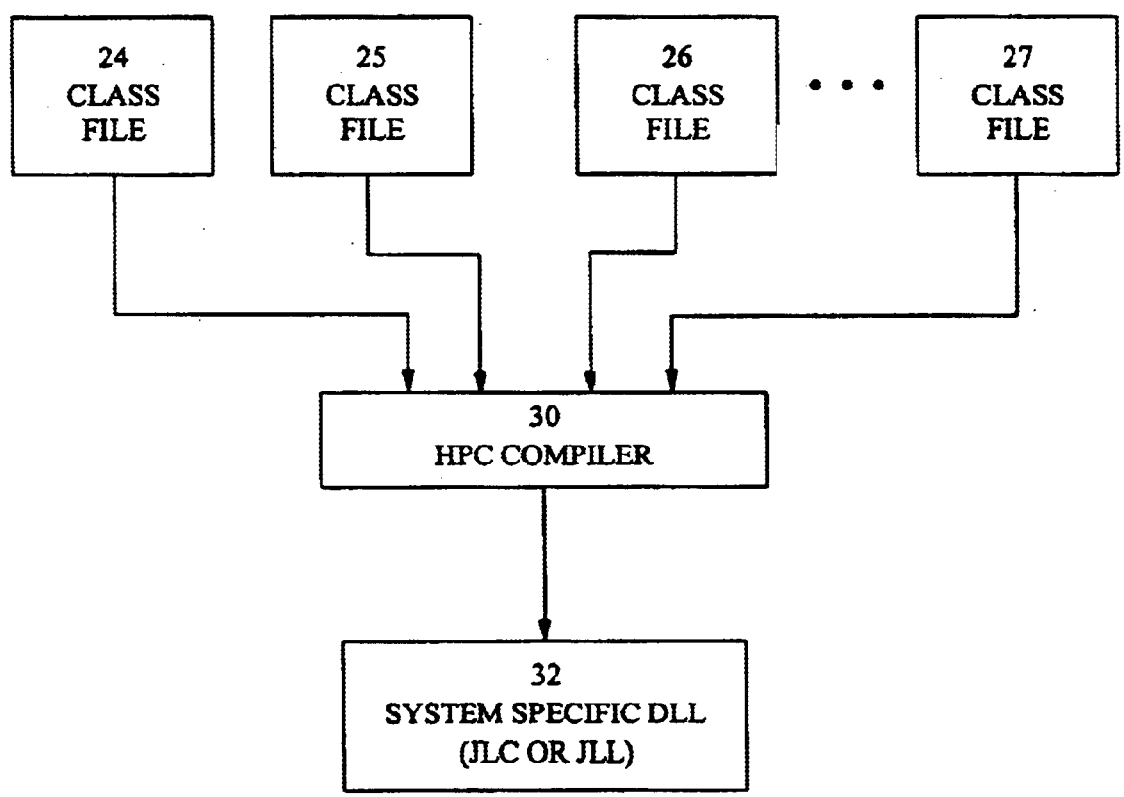
FIG. 9 is a flow chart of the process executed by the HPC compiler to generate object code from Java class files.

Referring to FIG. 9, using HPC compiler 30, a user can compile Java class files 24–27 into object code 32. Compiler 30 can also accept Java source files 20, but in that case the compiler calls a source-to-bytecode compiler 22 (FIG. 14) first, before compiling the resulting class files 24–27 into object code. The output from compiler 30 is a system-specific dynamic loaded library (DLL) 32. HPC compiler 30 can, under user control, generate either simple DLLs or compound DLLs. A simple DLL, also called a Java Loadable Class (JLC) contains exactly one class, while a compound DLL, also called a Java Loadable Library (JLL) can contain many classes. When generating a JLL, the compiler is given the set of classes that it needs to compile to build the JLL; it compiles each class individually, generating an object module for each, and uses a linker to bind the individual object modules into a single DLL 32.

Figure 10:
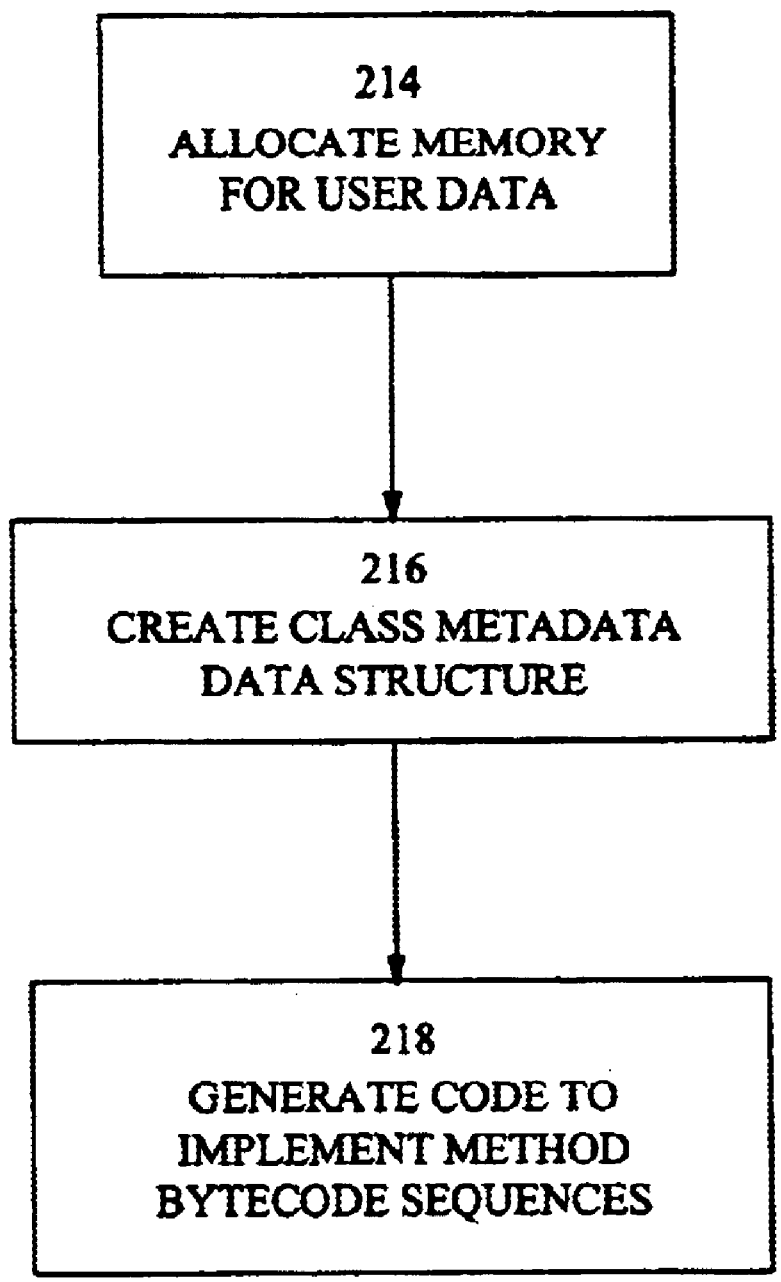
FIG. 10 is a flow chart illustrating HPC class compilation.

Referring to FIG. 10, for each class 24–27, the compiler:

1. In step 214 allocates memory for user data of the class.
2. In step 216 creates the class metadata data structure for this class in static memory.
3. In step 218 generates code to implement the bytecode sequences of each of the methods in the class.

User Data Memory Allocation 214

Memory for static fields 126 of a class, say class 26, are allocated in static memory by compiler 30. Memory for instance fields 128 of a class 26 are not allocated by the compiler. Since instance fields 128 of a class are part of an instance of an object 124, the memory of these fields 128 is allocated when the objects 124 are created (i.e., at run time) on the heap. The compiler determines the location (offset) of each instance field 128 of a class within an object 124 of that type for code generation purposes (ie., for compiling the putfield and getfield bytecodes), along with those of other classes 24–25, 27 that may be referred to by the class 26 being compiled.

Class Metadata Generation 216

Figure 11:
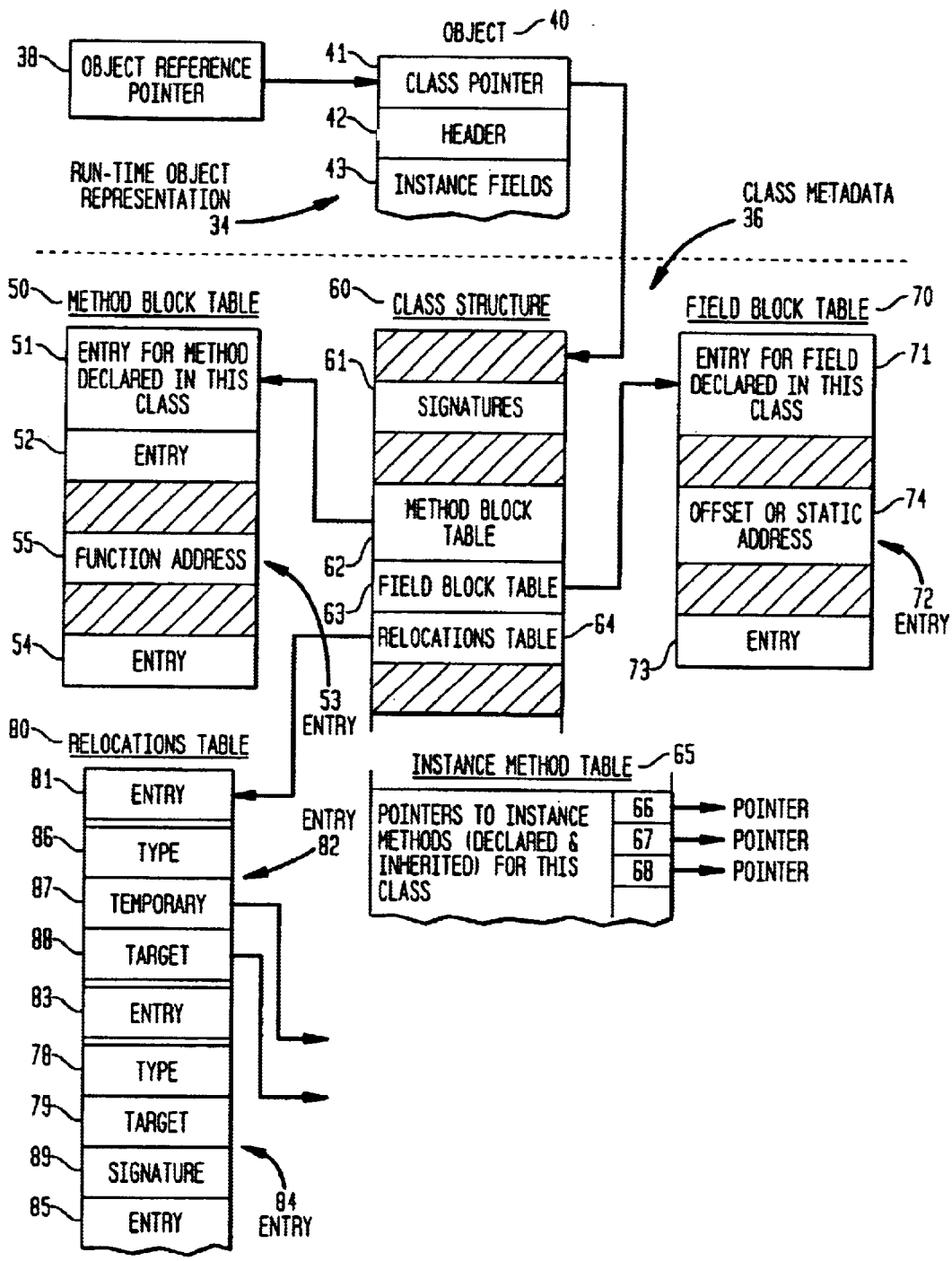
FIG. 11 is a system diagram of the HPC class metadata and object representations.

As discussed previously in connection with FIG. 8, referring here to FIG. 11, the class metadata 36 for a class contains information describing that class 26 which is used at run time to support language features such as inheritance, object serialization, etc.

Class metadata 36 generated in step 216 by HPC compiler 30 is shown along with the run time object representation 34. Only the fields relevant to the preferred embodiment of the invention are shown. Class metadata 36 includes class structure 60, field block table 70 and method block table 50. (Metadata 36 and metadata 204 represent substantially the same thing, generated in different environments: metadata 36 is generated by the HPC compiler, and metadata 204 is generated by virtual machine 28. Similarly, objects 34 and 124 are substantially the same.) An object reference 118 is a four byte pointer 38, which points to the memory for the object 40 (which is shown as object 124 in FIG. 1) allocated on a heap. When an object 124 of a particular type is allocated, it is initialized to have its first 4 bytes 41 point to the class structure 60 for its class. This field 41 is not altered during the lifetime of object 40, and is used to determine the class of the object at run time. A twelve byte header 42 follows class pointer 41 in object 40, and the remaining memory in the object is used to hold the instance fields 43 (instance fields 128 of FIG. 1) for that object 40 (object 124 of FIG. 1). These fields 43 are either inherited from the superclasses, say 25, of this object's class 26 or declared explicitly within the class 26. The offset of any particular instance field 43 in this object 40 is determined at compile time by the algorithm given in the pseudo code in Table 3, as follows:

TABLE 3

DETERMINING OFFSETS FOR INSTANCE FIELDS 43

```
offsets[] get offsets(class) { //Returns an array of
                               //structures. Each
                               //structure has two
                               //fields:offset and
                               //size.
  if superclass(class)==null then
    return 0-length array;
  end if;
  offsets [] off=get offsets (superclass (class));
  for each field f of class do
    if f is not an instance field then continue;
    grow off[] by one entry;           //f is an instance field
    off[length(off) −1] .offset=
    off[length(off) −2] .offset+
    off[length(off) −2] .size;
    off[length(off) −1] .size=
    size of(f);                        //8 bytes for long or
                                       //double;
                                       //4 bytes otherwise.
  end for
  return off [];
}
```

The basic procedure is to build the offsets table by taking the offsets table of the superclass, say 25, of the current class and appending the instance fields of the currents class, say 26, to this table. The order in which fields are appended is the same as the order in which they are found in the field information table 172 (FIG. 6) of the class file for this class 26 (omitting the static fields 126). There are no overridden fields, as they can still be used by references from the superclasses, say 25.

Referring further to FIG. 11, class structure 60 contains seven fields relevant to the preferred embodiment of the invention, and a variable-length instance method table 65. Instance method table 65 is at the end of class structure 60, and starts at a fixed offset from the top of the class structure. This table 65 contains pointers 66–68 to all of the instance methods 127 that can be invoked on this class 26. The instance methods 127 contained here include all of the instance methods declared within this class 26 and all of the instance methods 127 declared in the superclasses 25 of this class 26 which are not overriden by another superclass, say 24, of this class 26. (Instance method table 65 and method information table 173 exist in different environments but contain the same information. Method block table 50 is similar to method information table 173, but method table 65 is derived from method block tables 50 of this class and instance method tables 65 of its superclasses.) The pseudo-code for determining how this instance method table 65 is constructed is given in Table 4, as follows:

TABLE 4

BUILDING INSTANCE METHOD TABLE 65

```
function-ptr[]buildInstanceMethodTable (class) {
  function-ptr[]table=
    copy instance method table of superclass(class);
  for each instance method m of class do
    for i=0 . . . length(table) − 1 do
      if name, parameters and return type of m are
      the same as those of table[i]then
        table[i]=address of m;
        break;
      end if
    end for
```

TABLE 4-continued

BUILDING INSTANCE METHOD TABLE 65

```
    if i==length(table)then        //m not matched in
                                   //table-does not
                                   //override a
                                   //superclass'method
      grow length of table by one entry
      table[length(table) − 1]=address of m;
    end if
  end for
  return table;
}
```

Instance method table 65 for a class 26 is built by taking a copy of the instance method table 65 of its immediate superclass, say 25, replacing all entries (function pointers) in that table 65 which are overriden by methods 110 in the current class 26 with the function pointers 66–68 for the corresponding instance methods 127 in the current class 60, and appending the function pointers 66–68 for all remaining instance methods in the current class 60 to the end of the table. The order in which the remaining functions are appended is the same as the order in which they appear in the method information table of the class file for this class (omitting, of course, static methods and instance methods which override methods in superclasses). (As used herein, functions, methods, and procedures are different words for the same thing.) Thus the order of the function pointers 66–68 in the instance method table is dependent on the order of the methods 110 in the method information tables 173 of the class files for the current class 26 and all of its superclasses, say class files 24 and 25.

The seven fields in class structure 60 relevant to the preferred embodiment of this invention are method block table pointer 62, which points to the method block table 50 for this class; field block table pointer 63, which points to the field block table 70 for this class 60; relocations table pointer 64, which points to the relocations table 80 for this class 60, and four signatures 61 for this class.

Method block table 50 contains one entry 51–54 for each (static and instance) method 110 declared within this class 26. Inherited methods are not included in the method block table 50 for a class 26. Each entry 51–54 in method block table 50 contains a number of fields. The only one of relevance to the preferred embodiment of the invention is function address field 55 (shown in this example only for entry 53), which contains a pointer to the code implementing this particular function 110. The method block table 50 for a class is equivalent to a compiled version of the method information table 173 for class file 26. In particular, the order of entries 51–54 in table 50 for class file 26 is exactly the same as the order of the corresponding entries in the method information table 173 of the class file 26. (In Java, a class file describes exactly one class.)

Field block table 70 contains one entry 71–73 for each (static and instance) field 111 declared within this class 26. Inherited fields are not included in the field block table 70 for a class 26. The only field of relevance to this preferred embodiment of the invention in an entry 71–73 of field block table 70 is the offset-address field 74, which contains the address of the field (for static fields 126) or the offset from the start of an object's memory for that field (for instance fields 128). The field block table 70 for a class 26 is viewed as a compiled version of the field information table 172 from the corresponding class file 26. In particular, the order of entries 71–73 in this table 70 is exactly the same as the order of the corresponding entries in the field information table 172 of the class file.

Figure 12:
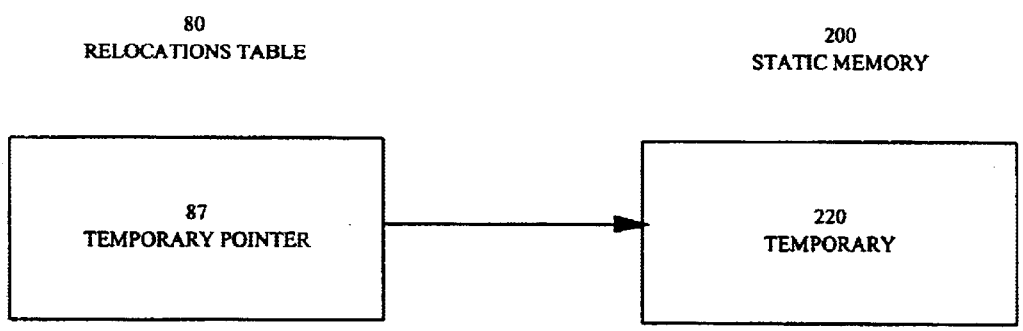
FIG. 12 is a diagrammatic representation of the correspondence between temporary pointers in the metadata relocations table and temporary fields in static memory.

Relocations table 80 is a table consisting of a number of variable-length entries 81–85 called relocation entries. There are two types 86 of relocation entries. The first type is an address relocation entry 82. An address relocation entry 82 is used in code generation to access data and code from other compiled Java classes, DLLs 33. Referring to FIG. 12, for each address relocation 82, a 4-byte temporary 220 is generated in static memory 200 by the compiler 30, and the relocation entry 82 contains a pointer 87 to this temporary 220. The relocation entry 82 also contains a pointer 88 to a string containing the name of the data (static field 126) or function (static method 125) or class structure 60 (class name) whose address should be copied into the relocation temporary 220. The resolution of address relocations is performed at class loading time 181 (FIG. 7). The second type 86 of relocation is a binary compatibility relocation 84. This relocation entry 84 contains a signature 89 for an aspect of another class 24–25, 27 (e.g., order of instance fields 128, or 43, in that class) which is required to be maintained in order for correct execution of the program 32. This expected signature 89 is compared to the actual signature 61 (containing four fields, one for each aspect of this class) for that aspect of the target class at class loading time, and if the signatures do not match, program execution is aborted. Relocations table 80 contains a number of such binary compatibility relocation entries 84, each including type field 78, target field 79 and signature field 89. Type 78 indicates which of the four assumptions to which this entry 84 pertains, target 79 indicates which class, and signature 89 is the signature expected to be found in some other class.

Class structure 60 contains four 32-bit signature fields 61. They are signatures for the order of the instance method table 65 for this class 26, the order of the instance fields 43 of this class 26, the order of the method block table 50 for this class 26, and the order of the field block table 70 for this class 26. The signatures are computed using a hashing function on a string generated by concatenating the names and signatures of all of the methods or fields in the relevant table in the order required. The hashing function is given in Table 5, as follows:

TABLE 5

DIGITAL SIGNATURE ALGORITHM

```
int signature(string s) {
    int sig=0;
    char c[]=all the characters of s, in order
    for i=0 . . . length(c) −1 do
        sig=(sig<<5)+sig+c[i];
    end for
    return sig;
}
```

Code Generation 218

Code generation by compiler 30 consists of generating machine instructions in DLL 32 to implement the bytecode sequences 175 for each of the methods 110 in a class file, say 26. Code generation for the method invocation bytecodes 176 invokevirtual, invokestatic, invokeinterface and invokespecial, and code generation for the data access bytecodes 177 getfield, putfield, getstatic and putstatic are the only aspects of code generation relevant to the preferred embodiment of the invention.

The method invocation bytecodes 176 are invokestatic, invokevirtual, invokeinterface and invokespecial. Code generation for these proceeds as follows:

For this class 26, the invokestatic bytecode specifies a class 24–25, 27 and a static method 125 within that class which should be invoked. If the class, say 24, specified is in the same DLL 32 as the caller class 26, then HPC compiler 30 emits a direct call to the method 110 specified. If the class specified is not in the same DLL 32 as the caller class 26 (we'll refer to class 107 for this purpose), then the compiler 30 generates a relocation entry 82 specifying the name of the class (the referent class 107) and the index of the method 110 in the method block table 50 of the class metadata 36 of referent class 107. The accompanying relocation temporary 220 will contain the address of the appropriate method 110, initialized by the run time system when the caller class 26 is loaded. This temporary 220 is then dereferenced to obtain a function pointer 55 which is used to call the appropriate method. (Object reference pointer 38 is an object reference 118.)

The invokevirtual bytecode 176 specifies a class 24–25, 27 and an instance method 127 within that class which should be invoked in the context of an object reference 38 which is on top of the bytecode 175 stack when this bytecode is executed. However, due to inheritance, the actual method 110 invoked may not be the method 110 in the class specified, but may be an overriding method specified in one of its subclasses. It generates code to dereference the object reference 38, thus retrieving the address of the class structure 60 for the class of the object. The compiler 30 determines the byte offset of the specified method 110 in the instance method table 65 of the class metadata of the class specified in the bytecode 176. It then dereferences the address obtained by adding this offset and the size of the fixed size header (in bytes) in the class structure (the number of bytes between the top of the class structure 60 and the start of the instance method table 65 in the class structure) to the address of the class structure previously obtained. This yields the address of the function contained in the computed location of the instance method table 65. This function pointer 66–68 is used to indirectly call the appropriate method 110. This code sequence is the same for both inter- and intra-DLL 32 calls using the invokevirtual bytecode.

The invokeinterface bytecode 176 specifies the name of an interface class 103 (say, 27) and an interface method 110 which is to be invoked in the context of the object reference 118 on the top of the bytecode stack 175. The object must be an instance 124 of a class 106 which implements the specified interface 110. The compiler 30 generates a call to a run time routine which takes a pointer 41 to the interface class 103 class metadata 36, the index of the interface method 51–54 in the interface class' method block table 50, and the object reference 38/118, and returns a function pointer 66–68 which is the instance method 127 of the object 124 that implements the interface method 127 specified in the bytecode 176. The pointer 41 to the class metadata 36 is obtained by use of a relocation, if the interface class 103 is in a different DLL 33 from the caller.

The invokespecial bytecode 176 is compiled in exactly the same manner as either the invokestatic bytecode or the invokevirtual bytecode, depending on the exact method 110 being called and whether or not certain bits are set in the class file.

The field access bytecodes 177 are getfield, putfield, getstatic and putstatic. Code generation for these proceeds as follows:

Static fields 126 of a class 26 are accessed via the getstatic (for reads) and putstatic (for writes) bytecodes 177. Each bytecode 177 specifies the name of a class 24–27 and the name of the field 111 to access. For putstatic, the element on top of the bytecode stack 175 is written into the field 43, while for getstatic, the data stored in that field 43 is returned to the top of the bytecode stack 175. If the referent class 27 is within the same DLL 32 as the current class 26, then the compiler 30 generates a direct reference to the field in the compiled code (which is resolved by the linker when the object module is bound into the DLL 32). If the referent class 107 is in a different DLL 33 from the current class 26, then the compiler creates a relocation 82 specifying the name of the referent class 107 and the index of the specified field 111 in the field block table 70 (FIG. 11) of the class metadata 36 of referent class 107. The accompanying relocation temporary 220 (pointer 87 points to relocation temporary 220) will be initialized to contain the address of the specified field 74 by the run time system when the current class 26 is loaded. The compiler 30 generates code 32 to obtain the address of that field by dereferencing the relocation temporary 220.

Instance fields 43/128 are accessed via the getfield (for reads) and putfield (for writes) bytecodes 177. Each bytecode 177 specifies the name of a class 24–25, 27 and the name of the field 111 to access. The bytecodes 177 are executed in the context of the object reference 118 on top of the bytecode stack 175. The compiler 30 generates the address of the specified instance field 43/128 by computing the byte offset of the field in the instance data 128 of the specified class, adding it to the size of the object header 42 (16 bytes) and the object reference 118 itself. This is the same code 177 generated regardless of whether or not the referent class is in the same DLL 32 as the current class 26.

Part 3: Execution of Java Applications Built Using HPC

Figure 13:
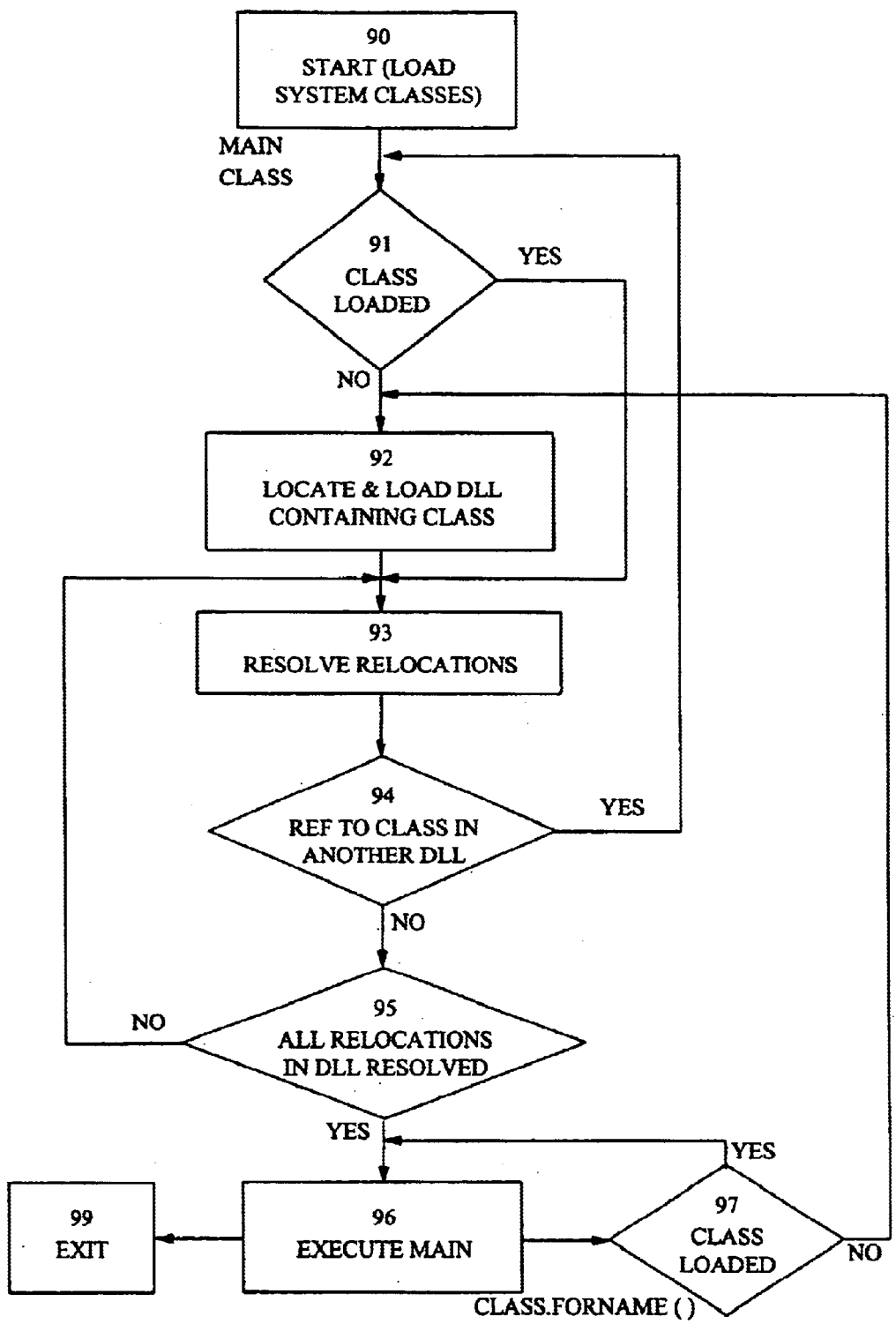
FIG. 13 is a flowchart of the application execution process in HPC.
Figure 14:
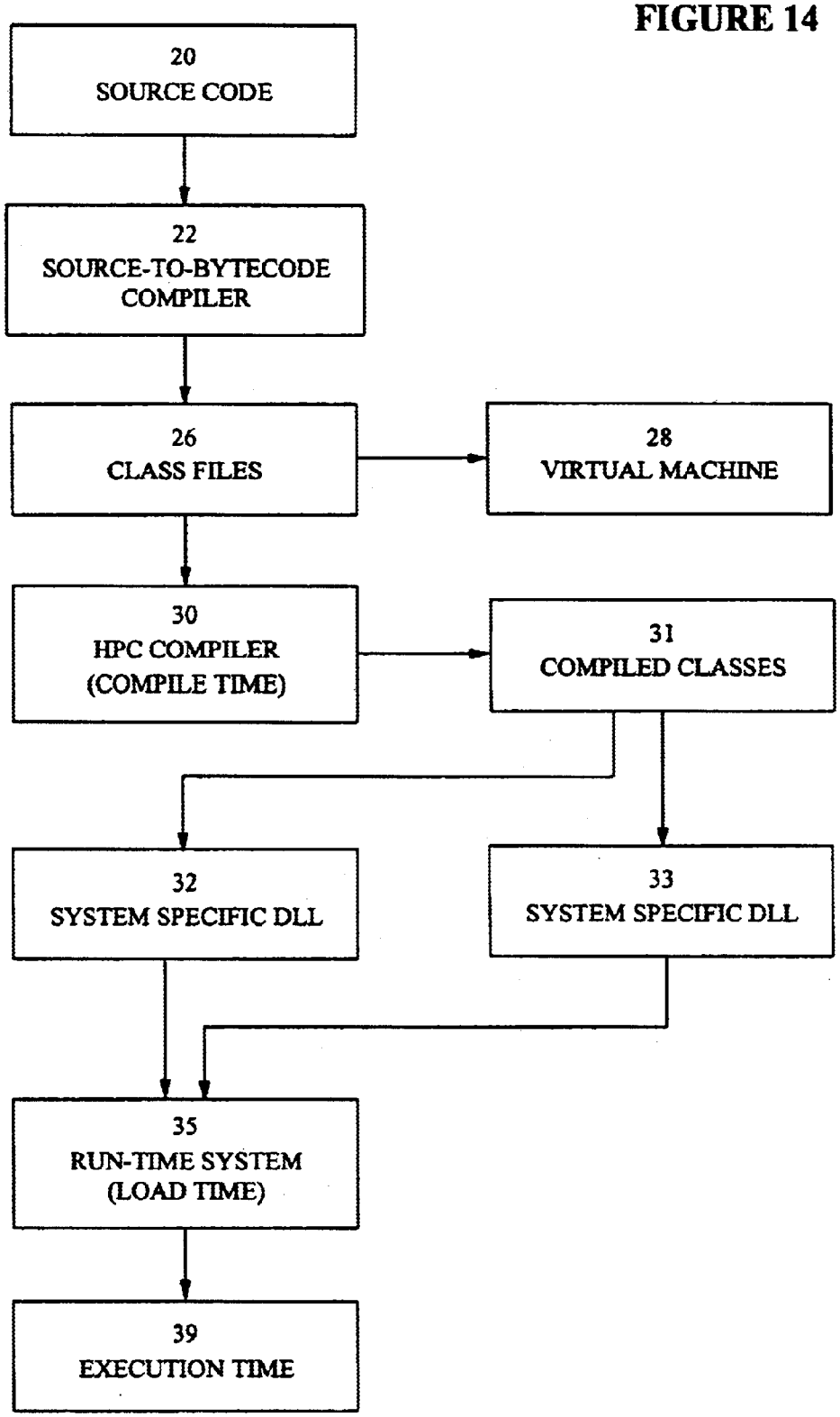
FIG. 14 is a flowchart representation of class embodiments through compile, load and execution times.

Referring to FIGS. 13 and 14, a preferred embodiment will be described of the method of the invention for executing Java applications built using HPC compiler 30. The application consisting of one or more Java classes 24–27 is compiled into one or more DLLs 32, 33. DLLs 32 and 33 contain both code and data, and class metadata 36 is part of that data generated by the compiler. The run time system 35 initially loads all of the DLLs 32, 33 that contain the system classes (e.g., the package java.lang class 102, etc.) from known locations and resolves all of the relocations for these classes.

In step 90, in starting the application, the user specifies the class 108 containing the main method of the application (i.e., the starting point).

In steps 91 and 92, the run time system attempts to locate a DLL 32, 33 containing this compiled class and loads it, if found. (In this embodiment, the DLLs 32, 33 containing classes that are searched for will be located. In the case that they are not, the run time system 35 throws an exception which usually results in termination of the application.)

Referring to FIG. 14, DLLs 32, 33 containing compiled classes are located using the user's CLASSPATH environment variable. The value of the CLASSPATH environment variable consists of a number of directories or files specifiers separated by a system-specific path separator (":" on AIX, ";" on Windows and OS/2). The files in the classpath may have the .jll extension, the .zip extension or the .jar extension. The run time system 35 searches the classpath for the DLL containing a class as follows:

Rule 1—Assume that C is a specifier for a directory in the classpath setting; for instance, C=/u/hpj. If a search needs to be conducted for the required class java.lang.Error (where 'java' and 'lang' are packages, and 'Error' is a class), the following processing occurs:

I. The file, say file 26, /u/hpj/java/lang/Error.jlc is examined to see if it contains the required class (say, one of classes 102–108).

II. The file, say file 25, /u/hpj/java.jll is examined and then the file, say file 26, /u/hpj/java/lang.jll is examined to see if either file contains the required class. This Rule 1(II) is performed iteratively for each of the package qualifiers in a class 102–108.

Rule 2—Assume that C is a .jll specifier; for example, C=/u/hpj/classes.jll. In this instance, the file 26 classes.jll is examined to see if it contains the required class 107.

Rule 3—Assume that C is an actual zip file 26, for example, C=/u/hpj/classes.jar, or the filename extension is .zip. In these instances, C is logically replaced by one or both of the following specifiers:

I. The specifier /u/hpj/classes.jll (if /u/hpj/classes.jll is a DLL 32, 33).

II. The specifier /u/hpj/classes (if /u/hpj/classes is a directory).

The .jll extension is added if the zip file has no extension on its filename. In this example, the file 26/u/hpj/classes.jll is examined first to see if it contains the required class. If /u/hpj/classes.jll does not contain the class, the /u/hpj/classes directory is searched using the directory search rules 1(I) and 1(II) previously described.

In step 93, when a DLL 32, 33 has been loaded, the run time system 35 processes the relocations table 80 for each of the classes 31 within the DLL. Processing relocations usually involves storing the appropriate address or value into the relocation temporary variable 220 referred to by the relocation 82.

Figures 15, 16:
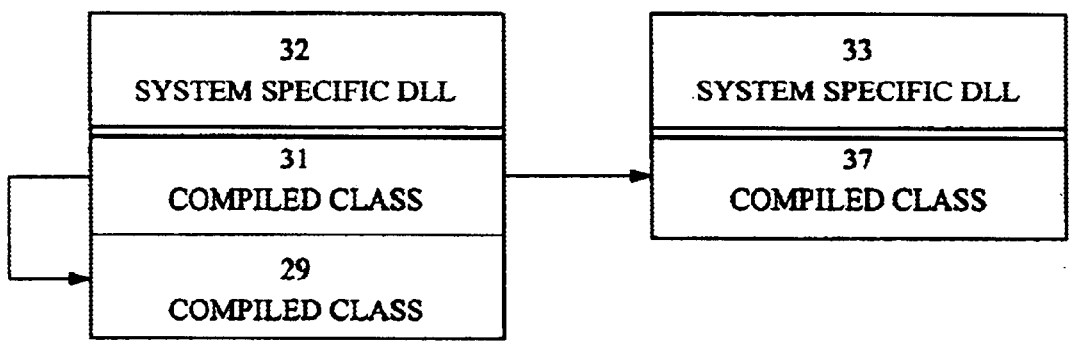
FIG. 15 is a diagrammatic representation of selected fields in the relocation table.
FIG. 16 is a diagrammatic representation of external classes.

Referring to FIG. 15, there are several types of relocation table 80 entries, as follows:

Class relocations 230: These relocations specify that the run time system should store the address of the class structure 60 of the specified class into the specified relocation temporary 220.

Dereference-off-class relocations 231: These relocations specify that the value stored at a particular offset from the top of the class structure 60 of a specified class 26 should be stored into the specified relocation temporary 220.

Static field and static method relocations 232: These specify that the address of the specified static field 126 or static method 125 of the specified class 26 should be stored into the specified relocation temporary 220.

Binary compatibility relocations 233: These specify that a particular signature 89 of the specified class should be checked to match the signature 61 specified in this relocation 233. No relocation temporary 220 is specified with these relocations 84.

In step 94 it is determined if, during relocation processing, other DLLs 33 may need to be loaded. This is because the relocations in table 80 refer to classes 31 in other DLLs 33, and these classes may not yet be loaded. In step 92, these DLLs will be located and loaded using the DLL locating algorithm described above (steps 91 and 92).

In steps 95 and 96, when all of the DLLs 32, 33 required to resolve all relocations have been loaded, and all the relocations have been processed, the main method (from class 108) of the application is executed. In step 96, the application may invoke the Class.forName() API to access classes compiled from classes 102–108 in the application 20. If in step 97 it is determined that the class 31 specified has not yet been loaded, it is loaded in step 92 using the class locating and loading algorithm used to load the main class. This may then cause new DLLs 33 to be loaded, and relocation processing to occur in step 93, before control is returned to the user application 96. This continues until the application 20 terminates in step 99.

Part 4: Release-to-Release Binary Compatibility in Java Virtual Machines

In this section, the RRBC problem in HPC is described. This is done by first explaining how a typical Java virtual machine 28 (not HPC) which executes Java class files 26 resolves references, from a referring class 26 to another referent class 27, from string names to addresses and offsets. This resolution is done at run time by a typical Java virtual machine 28. However, in HPC, this resolution is done at compile time, which is what causes the RRBC problem in HPC, which does not occur in typical Java virtual machines 28.

In Java class files 26, all references to entities (e.g., fields 111, methods 110) in other class files are by name. The bytecode 175 which refers to the external entity 110, 111 typically contains an index into the constant pool 171 which contains a string representing the name of the referent class 107 and another string representing the name of the relevant entity (110, 111) in that class. These references are resolved to addresses and offsets into internal virtual machine data structures 204 when the referent class is loaded.

Consider the example of an invokevirtual bytecode 176 specifying an external class 27. This bytecode contains a reference to the external class 27 and an instance method 143/127 within that class 27. Assuming lazy class loading 181 by the virtual machine, the referent class 27 will only be loaded by the virtual machine when this bytecode 176 is executed. When the class 27 is loaded, the class metadata 204 (including the instance method table 212) for that class 27 will be constructed by the virtual machine 28. At that point, the name references within this bytecode 176 can be replaced by the offset within the instance method table of this method (so that a fast lookup can be performed to dispatch this method on the next invocation of this bytecode 176). The getfield and putfield bytecodes 177 can be seen to work similarly, except that the relevant offset is within the instance data 144/111 for the class 31 instead of into the instance method table 212 for the class.

As another example, consider the invokestatic bytecode 176 specifying an external class 27. This bytecode contains a reference to the external class 27 and a static method 125 within that class 27. Assuming lazy class loading 181 by the virtual machine 28, the referent class 27 will only be loaded by the virtual machine 28 when this bytecode is executed. When the class 27 is loaded, the class metadata 204 for that class 27 (including code for the methods) will be constructed by the virtual machine 28. At that point, the name references within this bytecode 176 can be replaced by the address in memory of the bytecodes for the relevant method. The getstatic and putstatic bytecodes 177 can be seen to work similarly, except that the relevant addresses are for the static fields 126 of the referent class 27.

Virtual machines 28 that load classes aggressively (instead of lazily) will perform similar replacements of names with addresses and offsets when referent classes 27 are loaded. The only difference is that the referent classes 27 are all loaded at the beginning of program execution, instead of on-demand. The important point here is that these data structures 204 are built when classes are loaded into the virtual machine 28 at program execution time, and thus the name references to external classes 27 and entities 110, 111 within them are replaced by addresses and offsets at program execution time.

This implies that changes to the referent classes 27 that affect the number and order of fields 111 and methods 110 in those classes will not require that the referring classes 26 be recompiled (from Java source 20 into class files 26), as long as the entities 110, 111 being referred to still exist within the referent classes. This is because the addresses and offsets required by the referring classes 26 are only determined after the referent classes 27 are loaded into the virtual machine 28. These may change because of methods 110 or fields 111 being added or reordered, but then the referring classes 26 will have their offset or address references set accordingly to the changed values.

This, however, is not the case with HPC 30. In HPC code generation as described previously, the class metadata 36 is built statically, at compile time 30, and name references to external classes 27 and entities 110, 111 within those classes are turned into addresses and offsets at compile time. This means that the object module 32 for a Java class contains compiled-in assumptions about the layout of external compiled classes 27. If those classes 27 are modified so that these assumptions change, then the referring classes 26 must be recompiled in order to ensure correct execution. If the referring classes 26 are not recompiled, then the program will execute incorrectly, without any warning of the problem. This is the RRBC problem in HPC.

Referring to FIG. 17, the compiled-in assumptions 240 about external classes 27 that are made by HPC 30 when compiling a class 26 are:

The location (index) 241 of a static method 125 in the method block table 50 of its class metadata 36.

The location (index) 242 of a static field 126 in the field block table 70 of its class metadata 36.

The offset 243 of an instance method 127 in the instance method table 65 of its class metadata 36. The algorithm for determining this in HPC is given in Table 4, supra.

The offset 244 of an instance field 128 in an instance 124 of its class. The algorithm for determining this in HPC is given in Table 3, supra.

Part 5: How the RRBC Problem is Handled in HPC

Within the context of HPC 30, the RRBC problem may be approached in two ways (the second being the preferred embodiment of the invention):

First, dependencies 240 of the four types listed above can be eliminated by extending the relocation mechanism of HPC. Relocation temporaries 220 can be used to hold the offsets or indices 240 into the relevant data structures in metadata 36. These temporaries 220 would be initialized by the run time system 35 when the corresponding external class 37 is loaded, thus removing the relevant dependency. This approach to binary compatibility is used in systems such as SOM. The problem with this approach is that it reduces the performance of the application. First, the amount of time spent processing relocations at load time 35 grows significantly. Additionally, access to fields 111 and invocation of methods 110 now requires an additional level of indirection (i.e., dereferencing the static temporary 220 that contains the relevant offset or table index 240). Degrading the performance of the application is a serous problem for statically compiled Java (compile 30), since the entire reason for compiling Java applications statically is to improve performance.

Second, in accordance with the preferred embodiment of the invention, the run time system 35 can detect incompatibilities between classes 102–108 and notify the user of the problem, aborting the application in the process. The classes, say 26, require a list of assumptions 240 that have been made about other classes embedded into their metadata 36 that can be validated against the class metadata 36 of the referent classes, say 27, at run time 35. This solution allows the user to know when a recompilation 30 is required early in the execution phase 39 of the application (i.e., at startup). It also does not require source code 20 or bytecodes 175 to be present at execution time (i.e., all of the checking is performed with object code 32 only). This eliminates one serious problem—the problem of the incompatibility existing without being known by the user. This solution would also allow better performance of the application than the first solution, which adds an extra level of indirection to field access and method invocation to solve the problem.

Overview of the Preferred Embodiment

In accordance with the preferred embodiment of the invention, the assumptions (characterizing indicia) 240 about external classes made by the compiler 30 are summarized when compiling a particular class into its class metadata 36. These assumptions are then checked for correctness by the run time system when the class is loaded, and the application is aborted (and the user informed) if any of the checks fail. Referring to FIGS. 16 and 17, to recapitulate, if a class A 31 makes references to a class B 29 or 37, the compiler 30 may make the following assumptions 240 about class B 29 or 37 when compiling class A 31:

1. The index (i.e., offset) 241 of a static method 125 in the method block table 50 of class B 29 or 37. This assumption is made when compiling the invokestatic bytecode in the case where the referent class B 37 is in a different DLL 33 from class A 31, and for the invokeinterface bytecode where the referent class B 29 may or may not be in a different DLL from class A 31.
2. The index 242 (i.e., offset) of a static field 126 in the field block table 70 of class B 29 or 37. This assumption is made when compiling the getstatic and putstatic bytecodes in the case where the referent class B 37 is in a different DLL 33 from class A 31.
3. The offset 243 of an instance method 127 in the instance method table 65 of class B 29 or 37. The algorithm for determining this in HPC is given in Table
4. This assumption is made when compiling the invokevirtual and invokespecial bytecodes, where class B 29 or 37 is the referent class. It is also made when generating the instance method table 65 for class A 31, where the implicit referent class 29 is the superclass of class A 31, since the instance method table 65 for class A 31 inherits entries from its superclass class 29 in the order that they were present in its superclass 29.
4. The offset 244 of an instance field 43/128 in an instance 40/124 of class B 29 or 37. The algorithm for determining this in HPC is given in Table 3, supra. This assumption is made when compiling the getfield and putfield bytecodes, where class B 29 or 37 is the referent class. It is also made when generating the instance field 43 layout for class A 31, where the implicit referent class 29 is the superclass of class A 31, since the instance field layout 43 for class A 31 inherits entries from its superclass 29 in the order that they were present in its superclass 29.

The preferred embodiment of the invention provides a system and method for RRBC checking which is space-efficient, which does not impose a significant execution time 39 overhead, and which allows separate checks for each assumption 240. That is, each assumption 240 represents a separate check, instead of one check per referent class 29, 37. This allows for aspects of a referent class 29, 37 to change without affecting binary compatibility if those assumptions 240 that were made are still valid after the change.

Approach

Figure 18:
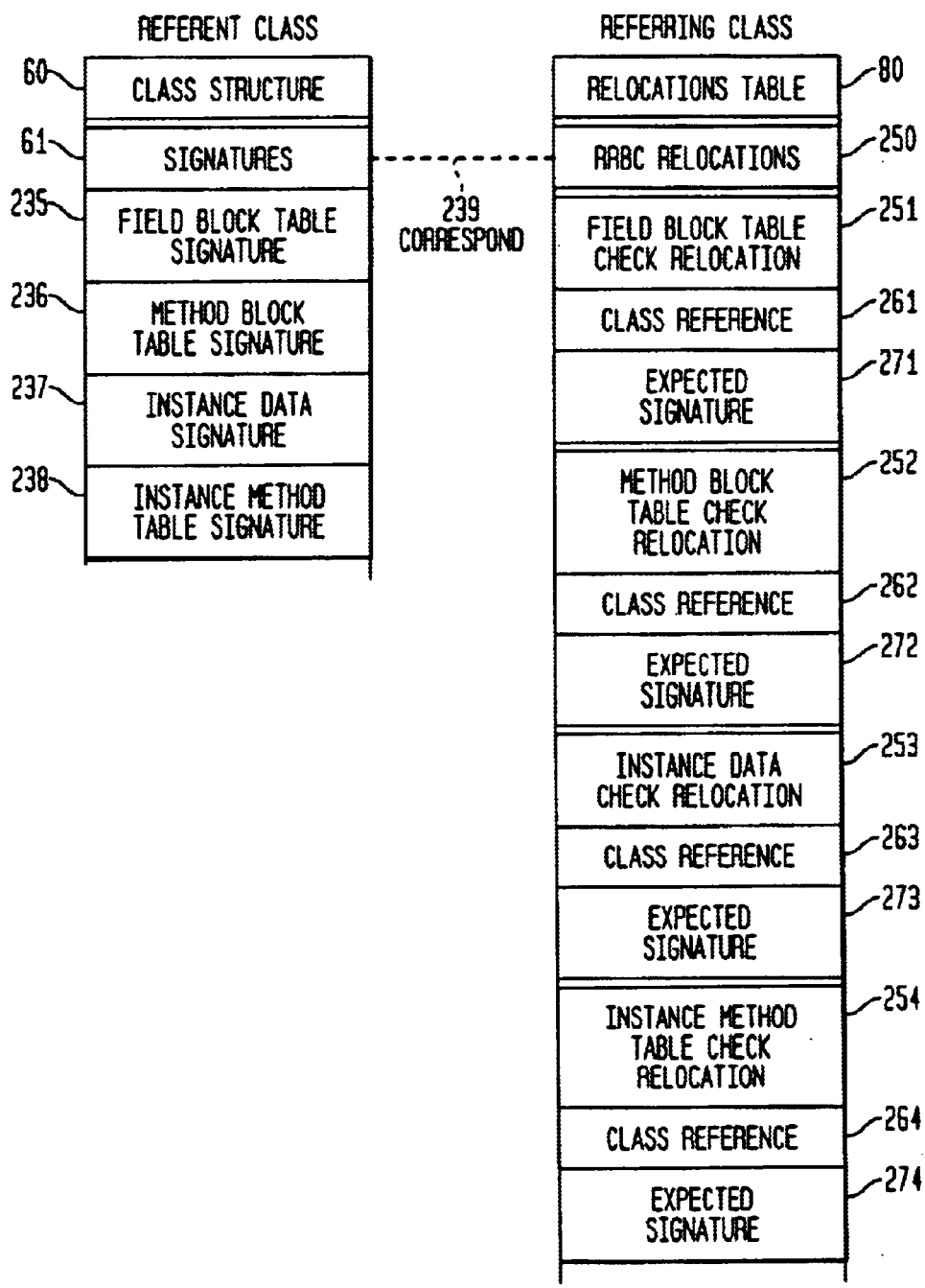
FIG. 18 is a diagrammatic representation of the class structure table and relocations table implementing the preferred embodiment of the system of the invention.

Referring to FIG. 18, in accordance with the preferred embodiment of the invention the four assumptions 240 that can be made about a class 31 are encoded into four signatures 61 in its class metadata 36. These are the field block table 70 signature 235, the method block table 50 signature 236, the instance data 43 signature 237 and the instance method table 65 signature 238.

Referring further to FIG. 18, the relocation table 80 for a class is augmented with four new types of relocations, called the RRBC relocations 250. As is represented by line 239, each of these relocations 251–254 corresponds to one of the four types of signatures 235–238, respectively, and are called the field block table check relocation 251, the method block table check relocation 252, the instance data check relocation 253, and the instance method table check relocation 254. Unlike other relocations 82, these RRBC relocations do not have a static temporary 220 associated with them. Instead, they contain a reference 261–264, respectively, to a class and the expected four byte signature 61 of the corresponding relocation type 271–274, respectively. For example, a field block table check relocation 251 in relocations table 80 in the metadata 36 of class 31 would contain in expected signature field 271 the expected field block table 70 signature 235 in the metadata 36 of the referent class 29 named in field 261. An RRBC relocations set (zero or more members) 250 may exist in the relocations table of this compiled class 31 for each referent class 29, 37 for which this class 31 makes relevant assumptions. There need not be an RRBC relocations set 250 for each referent class. Only those are required which correspond to assumptions being made. This allows characteristics which are not being relied upon to change without requiring recompilation.

In accordance with the preferred embodiment of the invention, HPC compiler 30 generates the four signature fields 235–238 in the class metadata 36 as part of class metadata generation. When compiling code for the bytecodes 175, it generates the RRBC relocations 250. These relocations are generated whenever it compiles a bytecode that requires one of the four assumptions 240 to be made about an external class 29, 37 referred to by the bytecode. For example, when compiling a getstatic bytecode which references an external class 37, the compiler generates a field block table 70 check relocation 251 in the relocation table 80 of the current class 31, with the external class 37 named in class reference 261 as the referent class, and the assumed field block table 70 signature 271 of the referent class 37 in the relocation 251. Multiple relocations 250 of the same type to the same referent class are not emitted.

The RRBC relocations 250 are processed as part of normal relocation processing (step 93) when classes are loaded by the HPC run time system 35. Processing an RRBC relocation 250 consists of checking the pertinent assumed (that is, expected) signature 271–274 in the relocation table 80 of this compiled class 31 with the actual signature 235–238, respectively, in the referent class 29, 37 named in the pertinent class reference field 261–254, respectively. If the signatures match, the check succeeds and execution 39 continues. if the signatures do not match, an error message is emitted detailing the situation and the application is aborted. (Signatures 235–238 in FIG. 18 correspond to signatures 89 in FIG. 11.)

Signature Generation

An element of the preferred embodiment of the invention is signature generation. The signature generation algorithm employed summarizes each of the four assumptions 240 made by this class 31 about an external class 29, 37 into a four byte integer. Each of these assumptions 240, in general, is about the order that certain named entities (methods 110 and fields 111) appear in a table, for example, tables 50, 70, 65 and 40. Since references to these entities in the bytecodes 175 are only by name, the complete unique representation for each of these tables would include each of the names in the order that they appear. A table content character string composed by concatenating the strings representing the names of the entities in a table with a special separator character between the names, in the order that they appear in the table provides a complete unique representation of that table. The difficulty with using such a string (or any similar representation) as a signature is that it is of variable length, and can be arbitrarily long. In fact, for many Java classes, this can be enormously long (far longer than four bytes).

Therefore, in accordance with the preferred embodiment, this table content character string is encoded using a digital signature. Digital signatures take arbitrarily long strings and compute a fixed-length checksum by performing an iterative calculation on the characters of the string in sequence from beginning to end. The CRC-32 standard is an example of a digital signature. One feature of all such checksums is that there is a possibility of collisions. That is, two different arbitrarily long strings can yield the same checksum. A carefully chosen checksum algorithm can reduce the possibility of collision quite dramatically, so that the possibility that any user would encounter it would be so small as to be negligible. While the non-zero possibility for collision renders this solution unusable for certain mission-critical applications, it is sufficient for most practical applications. Precedence for this lies in other uses of digital signatures for error checking, such as the use of checksums in most (if not all) communication protocols.

The specific digital signature algorithm used in the preferred embodiment is given in Table 5, supra. It takes a single string and generates a digital signature using shift-and-add operations. The string for each table 40, 50, 65 and 70 is composed of the concatenation of each entry in the table separated by the semicolon character. Each entry in a table consists of the Java field or method name concatenated with its Java type qualifier (a sequence of characters that specifies its Java type).

In accordance with the preferred embodiment of the invention, a system and method is provided for using digital signatures 61, 271–274 of various aspects of Java classes to determine whether a compiled class 31 has built-in assumptions about external classes 29, 37 that are incorrect due to modification and recompilation of the external class 29, 37. The aspects generally involve the layout of various run time structures in the external class 29, 37 such as field tables 40, 70 or method tables 50, 65. The signature algorithm can be any one of a number of well-known digital signature algorithms (such as IEEE's CRC-32) or the one shown in Table 5.

The invention may be implemented as an article of manufacture comprising a computer usable medium having computer readable program code means therein for executing the method steps of the invention or a program storage or memory device. Such an article of manufacture may include, but is not limited to, CD-ROMs, diskettes, tapes, hard drives, and computer RAM or ROM. Indeed, the article of manufacture or program storage device may be any solid or fluid transmission medium, magnetic or optical, or the like, for storing signals readable by a machine for controlling the operation of a computer according to the method of the invention. Also, the invention may be implemented in a computer system. A computer system may comprise a computer that includes a processor and a memory device and optionally, a storage device, a video display and/or an input device. Moreover, a computer system may comprise an interconnected network of computers. Computers may equally be in stand-alone form (such as the traditional desktop personal computer) or integrated into another apparatus (such as a cellular telephone).

While the invention has been particularly shown and described with respect to preferred embodiments thereof, it will be understood by those skilled in the art that the foregoing and other changes in form and details may be made therein without departing form the spirit and scope of the invention.

We claim:

1. A method for detecting binary compatibility in compiled object code, comprising the steps of:
   generating a signature for each of one or more structures during compilation of each of said one or more structures;
   comparing the signatures for corresponding structures at compile time, wherein said comparing comprises comparing an assumed signature of a referent structure in a referring structure with an actual signature of said referent structure; and
   responsive to said signatures not comparing equal, signaling incompatibility, said signaling indicating a need to recompile said referring structure.

2. The method of claim 1, said characterizing indicia including at least one assumption made about the order that named entities appear in a table in said referent class.

3. The method of claim 2, further comprising the step of generating said characterizing indicia as a function of a character stream including ordered references by name to bytecode entities providing a unique representation of said table.

4. The method of claim 3, wherein said character stream is encoded using a digital signature.

5. A method for detecting binary incompatibility in object code, comprising the steps of:
   during compilation of a referring class, encoding characterizing indicia for a referent class into class metadata for said referring class, said encoding characterizing indicia for said referent class in said class metadata for said referring class forming an assumed signature;
   during compilation of said referent class, encoding characterizing indicia of said referent class to form an actual signature of said referent class;
   during run time processing, processing a relocation by checking said assumed signature in the metadata for said referring class with said actual signature of the referent class;
   responsive to said signatures matching, continuing execution; and
   responsive to said signatures not matching, emitting an error message and aborting the application.

6. The method of claim 5, further comprising the step of encoding as said characterizing indicia at least one signature selected from the set comprising a field block table signature, an instance method table signature, an instance data signature, and a method block signature.

7. The method of claim 6, further comprising the step of calculating said field block table signature as a function of the indexes of one or more static field entries in a field block table.

8. The method of claim 6, further comprising the step of calculating said method block table signature as the index of a static method in the method block table of said referent class.

9. The method of claim 8, comprising the further step of:

encoding said method block table signature when compiling an invokestatic bytecode in the case where said referent class is in a different dynamic loaded library from said referring class; and encoding said method block table signature when compiling an invokeinterface bytecode.

10. The method of claim 6, further comprising the step of calculating said instance data signature as the offset of an instance field in an instance of said referent class.

11. The method of claim 10, further comprising the step of:

encoding said instance data signature when compiling getfield and putfield bytecodes for said referent class;

encoding said instance data signature when generating an instance field layout for said referring class; and encoding said instance data signature for an implicit referent class which is a superclass of said referring class.

12. The method of claim 6, further comprising the step of calculating said instance method table signature as the offset of an instance method in the instance method table of said referent table.

13. The method of claim 12, further comprising the step of:

encoding said instance method table signature when compiling the invokevirtual and invokespecial bytecodes; and encoding said instance method table signature when generating the instance method table of said referring class and implicit referent class is a superclass of said referring class A.

14. The method of claim 6, further comprising the step of encoding said characterizing indicia when compiling getstatic and putstatic bytecodes for said referent class in a different dynamic loaded library from said referring class.

15. A program storage device readable by a machine, tangibly embodying a program of instructions executable by a machine to perform a method for detecting binary compatibility in compiled object code, the method comprising the steps of:

generating a signature for each of one or more structures;

comparing the signatures for corresponding structures at compile time, said comparing compares an assumed signature of a referent structure in a referring structure with an actual signature of said referent structure; and responsive to said signatures not comparing equal, signaling incompatibility.

16. A computer system for detecting binary compatibility in compiled object code, comprising:

a referring class metadata store;

a referent class metadata store;

said referring class metadata store including a class structure table for storing during compilation of a referring class at least one signature indicia assumed by said referring class with respect to table contents in a referent class;

said referent class metadata store comprising a class structure table for storing during compilation of said referent class an actual class structure table signature; and a comparator for comparing said signature indicia assumed by said referring class with said actual class structure table signature in said referent class metadata store.

17. The computer system of claim 16, wherein said signature indicia being selected from the set comprising a field block table signature, an instance method table signature, an instance data signature, and a method block signature.

18. An article of manufacture comprising:

a computer useable medium having computer readable program code means embodied therein for detecting binary compatibility in compiled object code, the computer readable program means in said article of manufacture comprising:

computer readable program code means for causing a computer to effect generating a signature for each of one or more structures during compilation of said each of one or more structures;

computer readable program code means for causing a computer to effect comparing the signatures for corresponding structures at compile time, wherein said comparing comprises comparing an assumed signature of a referent structure in a referring structure with an actual signature of said referent structure; and computer readable program code means for causing a computer to effect, responsive to said signatures not comparing equal, signaling incompatibility, said signaling indicating a need to recompile said referring structure.

19. An article of manufacture comprising:

a computer useable medium having computer readable program code means embodied therein for detecting binary compatibility in compiled object code, the computer readable program means in said article of manufacture comprising:

computer readable program code means for causing a computer during compilation of a referring class, to encode characterizing indicia for a referent class into class metadata for said referring class;

computer readable program code means for causing a computer during run time processing, to process a relocation by checking an assumed signature in the relocation table of said referring class with an actual signature in the referent class;

computer readable code means for causing a computer responsive to said signatures matching, to continue execution; and computer readable code means for causing a computer responsive to said signatures not matching, to emit an error message and aborting the application.

20. The article of manufacture of claim 19, further comprising computer readable program code means for causing a computer to encode as said characterizing indicia at least one signature selected from the set comprising a field block table signature, an instance method table signature, an instance data signature, and a method block signature.

21. A method for detecting binary compatibility in compiled object code classes, said method comprising the steps of:

generating an assumed signature corresponding to one or more first assumptions of a plurality of possible assumptions of a second class in a first class, during compilation of said first class;

comparing an actual signature corresponding to said one or more first assumptions of said second class to said assumed signature corresponding to said one or more first assumptions at compile time;

responsive to said signatures comparing equal, determining class compatibility irrespective of changes in assumptions other than said first assumptions;

responsive to said signatures not comparing equal, signaling a need to recompile said first class;

whereby binary compatibility of object code classes is determined at the assumption as distinguished from the class level.

22. An article of manufacturing comprising:

a computer useable medium having computer readable program code means embodied therein for detecting binary compatibility in compiled object code, the computer readable program means in said article of manufacture comprising:

computer readable program code means for causing a computer to generate an assumed signature corresponding to one or more first assumptions of a plurality of possible assumptions of a second class in a first class during compilation of said first class;

computer readable program code means for causing a computer to compare an actual signature corresponding to said one or more first assumptions of said second class to said assumed signature corresponding to said one or more first assumptions at compile time;

computer readable program code means for causing a computer to determine class compatibility irrespective of changes in assumptions other than said first assumptions responsive to said signatures corresponding to said first assumptions comparing equal;

computer readable program code means for causing a computer to signal a need to recompile said first class if said signatures do not compare equal;

whereby binary compatibility of object code classes is determined at the assumption as distinguished from the class level.

23. A computer system for detecting binary compatibility in compiled object code, said computer system comprising:

means for generating a signature for each of one or more structures during compilation of said each of one or more structures;

means for comparing the signatures for corresponding structures at compile time, wherein said means for comparing comprises means for comparing an assumed signature of a referent structure in a referring structure with an actual signature of said referent structure; and means for signaling incompatibility responsive to said signatures not comparing equal, said signaling indicating a need to recompile said referring structure.

24. A computer system for detecting binary compatibility in object code, comprising:

means for encoding characterizing indicia for a referent class into class metadata for a referring class during compilation of said referring class, said encoded characterizing indicia forming an assumed signature;

means for encoding characterizing indicia for said referent class into class metadata for said referent class during compilation of said referent class, said encoded characterizing indicia in said class metadata for said referent class forming an actual signature;

means for checking said characterizing indicia for correspondence during run time processing, wherein said means for checking comprises means for processing a relocation by checking said assumed signature in the metadata for said referring class with said actual signature in the metadata for said referent class;

responsive to said signatures matching, continuing execution; and responsive to said signatures not matching, emitting an error message and aborting the application.

* * * * *